United States Patent
Atsuumi et al.

(10) Patent No.: US 7,719,773 B2
(45) Date of Patent: May 18, 2010

(54) ZOOM LENS UNIT AND IMAGING APPARATUS

(75) Inventors: Hiromichi Atsuumi, Yokohama (JP); Yoshifumi Sudoh, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 1 day.

(21) Appl. No.: 12/268,010

(22) Filed: Nov. 10, 2008

(65) Prior Publication Data
US 2009/0122418 A1   May 14, 2009

(30) Foreign Application Priority Data

Nov. 12, 2007  (JP) .............................. 2007-293621
Jun. 24, 2008  (JP) .............................. 2008-164467

(51) Int. Cl.
*G02B 15/14* (2006.01)
(52) U.S. Cl. ..................................... 359/683; 359/676
(58) Field of Classification Search ................. 359/676, 359/683
See application file for complete search history.

(56) References Cited

U.S. PATENT DOCUMENTS

| | | | |
|---|---|---|---|
| 5,233,454 A | 8/1993 | Sakuma et al. |
| 5,355,244 A | 10/1994 | Suzuki et al. |
| 5,408,095 A | 4/1995 | Atsuumi et al. |
| 5,426,298 A | 6/1995 | Sakuma et al. |
| 5,459,601 A | 10/1995 | Suzuki et al. |
| 5,475,522 A | 12/1995 | Itabashi et al. |
| 5,504,613 A | 4/1996 | Itabashi et al. |
| 5,684,618 A | 11/1997 | Atsuumi |
| 6,078,419 A | 6/2000 | Atsuumi |
| 6,198,563 B1 | 3/2001 | Atsuumi |
| 6,388,792 B1 | 5/2002 | Atsuumi et al. |
| 6,417,509 B1 | 7/2002 | Atsuumi et al. |
| 6,448,998 B1 | 9/2002 | Suzuki et al. |
| 6,509,995 B1 | 1/2003 | Suzuki et al. |
| 6,596,985 B2 | 7/2003 | Sakai et al. |
| 6,606,179 B2 | 8/2003 | Suzuki et al. |
| 6,697,183 B2 | 2/2004 | Atsuumi et al. |
| 6,771,407 B2 | 8/2004 | Hayashi et al. |
| 6,781,729 B2 | 8/2004 | Suzuki et al. |
| 6,785,028 B1 | 8/2004 | Atsuumi et al. |
| 6,791,729 B2 | 9/2004 | Atsuumi et al. |

(Continued)

FOREIGN PATENT DOCUMENTS

JP    08-248318    9/1996

(Continued)

*Primary Examiner*—Scott J Sugarman
(74) *Attorney, Agent, or Firm*—Dickstein Shapiro LLP

(57) ABSTRACT

A zoom lens unit includes, in order from an object side to an image side: a first lens group having a positive refracting power; a second lens group having a negative refracting power; a third lens group having a positive refracting power; a fourth lens group having a negative refracting power; a fifth lens group having a positive refracting power; and a sixth lens group having a negative refracting power, an aperture stop is disposed between the second lens group and the third lens group, and when changing magnification from a wide-angle end to a telephoto end, at least the second lens group, the third lens group and the fifth lens group are moved, and the first lens group includes a reflecting optical element which bends a light path in the first lens group to obtain a predetermined light path length.

15 Claims, 18 Drawing Sheets

U.S. PATENT DOCUMENTS

| | | |
|---|---|---|
| 6,800,845 B2 | 10/2004 | Sakai et al. |
| 6,801,351 B2 | 10/2004 | Suzuki et al. |
| 6,829,104 B2 | 12/2004 | Suzuki et al. |
| 6,937,371 B2 | 8/2005 | Hayashi et al. |
| 6,961,164 B2 | 11/2005 | Atsuumi |
| 6,999,208 B2 | 2/2006 | Suzuki et al. |
| 7,006,120 B2 | 2/2006 | Sakai et al. |
| 7,012,724 B2 | 3/2006 | Atsuumi et al. |
| 7,038,822 B2 | 5/2006 | Sakai et al. |
| 7,050,210 B2 | 5/2006 | Atsuumi et al. |
| 7,068,407 B2 | 6/2006 | Sakai et al. |
| 7,106,483 B2 | 9/2006 | Hayashi et al. |
| 7,126,737 B2 | 10/2006 | Atsuumi et al. |
| 7,154,651 B2 | 12/2006 | Atsuumi et al. |
| 7,164,516 B2 | 1/2007 | Hayashi et al. |
| 7,215,354 B1 | 5/2007 | Sakai et al. |
| 7,236,281 B2 | 6/2007 | Hayashi et al. |
| 7,271,823 B2 | 9/2007 | Izumi et al. |
| 7,298,537 B2 | 11/2007 | Hayashi et al. |
| 7,372,636 B2 | 5/2008 | Sudoh |
| 7,397,591 B2 | 7/2008 | Hayashi et al. |
| 2001/0030809 A1* | 10/2001 | Hayakawa et al. .......... 359/557 |
| 2002/0060844 A1* | 5/2002 | Hayakawa et al. .......... 359/557 |
| 2002/0154409 A1* | 10/2002 | Hayakawa et al. .......... 359/557 |
| 2005/0168807 A1* | 8/2005 | Endo .......................... 359/354 |
| 2005/0280884 A1 | 12/2005 | Atsuumi et al. |
| 2006/0238845 A1 | 10/2006 | Atsuumi et al. |
| 2007/0206261 A1 | 9/2007 | Hayashi et al. |
| 2007/0247726 A1 | 10/2007 | Sudoh |

FOREIGN PATENT DOCUMENTS

| | | |
|---|---|---|
| JP | 2005-215165 | 8/2005 |

* cited by examiner

ZOOM LENS UNIT AND IMAGING APPARATUS

BACKGROUND OF THE INVENTION

1. Field of the Invention

The present invention relates to a zoom lens unit and an imaging apparatus including the zoom lens unit. In particular, the zoom lens unit according to the present invention is suitable for use in such as a video camera or an electronic still camera which employs a solid-state image sensor as an imaging device. The imaging apparatus including the zoom lens unit according to the present invention is suitable for use as a video camera or an electronic still camera.

2. Description of the Related Art

In recent years, higher performance and compactness have been required for digital cameras. In addition, both higher performance and compactness have been required for zoom lens units used in photographing lenses. Considering the application of the zoom lens unit to a high end, for example, the digital camera, at least a resolution corresponding to an image pickup device having 5 million to 10 million pixels over all a zoom area is necessary to achieve higher performance of such zoom lens units.

In addition, many users require a photographing lens with wide-angle capability and high magnification ratio, and it is desirable that a half-field angle of a zoom lens unit at a wide-angle end be 38 degrees or more. The half-field angle of 38 degrees corresponds to a focal length of 28 mm in terms of a 35 mm silver salt camera (so-called Leica version). Moreover, a magnification ratio of five or more is desired.

Regarding compact cameras, JP H8-248318 A and JP 2005-215165 A disclose zoom lens units in which a prism is disposed in an optical system to bend the light path, and thus a thin-model camera equipped with the zoom lens unit can be obtained.

Each zoom lens unit described in JP H8-248318 A and JP 2005-215165 A is suitable for a video camera, and a magnification ratio is 8 times or more in an embodiment of JP H8-248318 A, or is 7 times or more in an embodiment of JP 2005-215165 A, both of which are excellent. However, a half-field angle at a wide-angle end is about 33 degrees in JP H8-248318 A, or is about 34 degrees in JP 2005-215165 A, therefore both fail to achieve a half-field angle of 38 degrees or more, which is desirable for digital cameras recently.

SUMMARY OF THE INVENTION

At least an object of the present invention is to provide, for example, a zoom lens unit suitable for a compact digital camera with high performance, which has a resolution corresponding to an image pickup device having 5 million to 10 million pixels, and a half-field angle at a wide-angle end of 38 degrees or more, and a magnification ratio of 5 times or more.

Another object of the present invention is to provide, for example, an imaging apparatus including the zoom lens unit.

In light of the above mentioned, the present invention proposes, for example, a zoom lens unit including, in order from an object side to an image side: a first lens group having a positive refracting power, which is fixed when changing magnification from a wide-angle end to a telephoto end; a second lens group having a negative refracting power; a third lens group having a positive refracting power; a fourth lens group having a negative refracting power, which is fixed when changing magnification from the wide-angle end to the telephoto end; a fifth lens group having a positive refracting power; and a sixth lens group having a negative refracting power, an aperture stop being disposed between the second lens group and the third lens group.

When changing magnification from the wide-angle end to the telephoto end, at least the second lens group, the third lens group and the fifth lens group are moved, to carry out a magnification change. In addition, the first lens group has a reflecting optical element which is configured to bend a light path in the first lens group to obtain a predetermined light path length. The reflecting optical element is disposed in the first lens group as a constituent element thereof.

The present invention further proposes, for example, an imaging apparatus including the above-mentioned zoom lens unit.

BRIEF DESCRIPTION OF THE DRAWINGS

The invention will be described further below with reference to exemplary embodiments and the accompanying schematic drawings, in which.

DETAILED DESCRIPTION OF THE PREFERRED EMBODIMENTS

Hereinafter, embodiments of a zoom lens unit according to the present invention will be explained.

Figure 1:
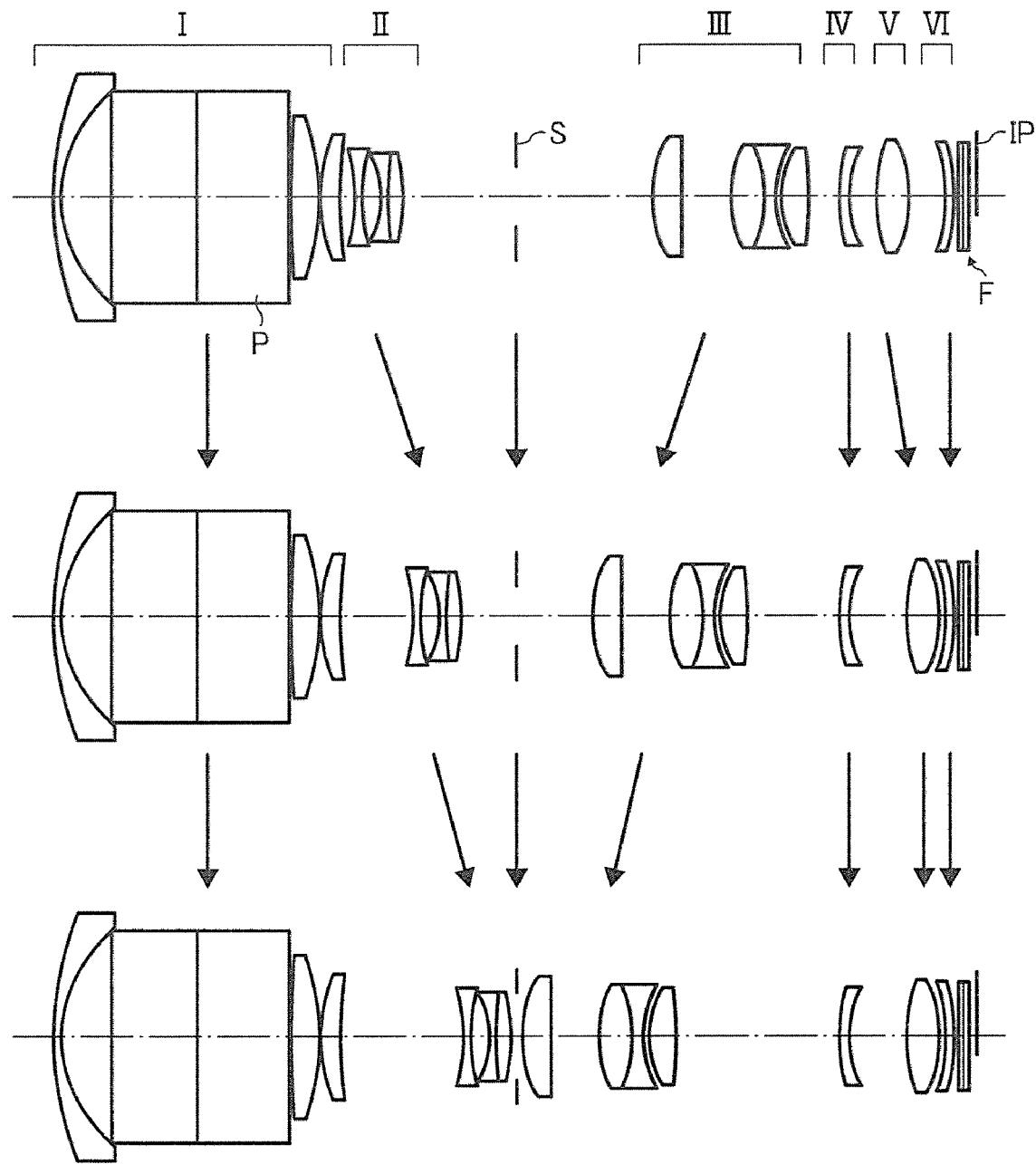
FIG. 1 illustrates a structure of a zoom lens unit according to a first embodiment of the present invention and displacements of lens groups when changing magnification.

FIG. 1 illustrates a first embodiment of the zoom lens unit according to the present invention. This embodiment concerns a first example explained later.

FIG. 1 illustrates a structure of a zoom lens unit including a plurality of lens groups and displacements of the plurality of lens groups when changing magnification. In FIG. 1, the upper figure illustrates an arrangement state of the plurality of lens groups at a wide-angle end, the middle figure illustrates an arrangement state of the plurality of lens groups at a specific intermediate focal length, and the lower figure illustrates an arrangement state of the plurality of lens groups at a telephoto end. Each of the arrows indicates a displacement of each lens group of the plurality of lens groups when changing magnification from the wide-angle end to the telephoto end.

As illustrated in FIG. 1, the zoom lens unit according to the first embodiment includes, in order from an object side to an image side: a first lens group (I) having a positive refracting power, which is fixed when changing magnification from the wide-angle end to the telephoto end; a second lens group (II) having a negative refracting power; a third lens group (III) having a positive refracting power; a fourth lens group (IV) having a negative refracting power, which is fixed when changing magnification from the wide-angle end to the telephoto end; a fifth lens group (V) having a positive refracting power; and a sixth lens group (VI) having a negative refracting power. An aperture stop (S) is disposed between the second lens group (II) and the third lens group (III).

The second lens group (II), the third lens group (III) and the fifth lens group (V) are moved when changing magnification from the wide-angle end to the telephoto end. In other words, a distance between the first lens group (I) and the second lens group (II) increases by a displacement of the second lens group (II) to the image side. In addition, a distance between the second lens group (II) and the third lens group (III) decreases by the displacement of the second lens group (II) to the image side and a displacement of the third lens group (III) to the object side, a distance between the third lens group (III) and the fourth lens group (IV) increases by the displacement of the third lens group (III) to the object side. And, a distance between the fourth lens group (IV) and the fifth lens group (V) increases, and a distance between the fifth lens group (V) and the sixth lens group (VI) decreases, by a displacement of the fifth lens group (V) to the image side.

In the present embodiment, the first lens group (I), the aperture stop (S), the fourth lens group (IV) and the sixth lens group (VI) are fixed when changing magnification.

The first lens group (I) has, in order from the object side to the image side: a negative meniscus lens, a prism (P) functioning as a reflecting optical element, and two positive lenses. The negative meniscus lens has a convex surface toward the object side and an aspheric surface on an image surface side.

The second lens group (II) has three lenses, in which a first biconcave negative lens having an aspheric surface on the image surface side, a second biconcave negative lens and a biconvex positive lens are disposed in this order from the object side. The second biconcave negative lens and the biconvex positive lens form a cemented lens.

The aperture stop (S) is disposed between the second lens group (II) and the third lens group (III). The third lens group (III) has a positive meniscus lens, a cemented lens formed by a first biconvex positive lens and a biconcave negative lens, and a second biconvex positive lens, disposed in this order from the object side. The positive meniscus lens has an aspheric surface on the object side, and a stronger convex surface of the positive meniscus lens towards the object side.

The fourth lens group (IV) has one negative meniscus lens which includes a convex surface on the object side and an aspheric surface on the image surface side.

The fifth lens group (V) has one biconvex positive lens which includes an aspheric surface on the object side.

The sixth lens group (VI) has one negative meniscus lens which includes an aspheric surface on the object side, and a convex surface of the negative meniscus lens toward the image surface side.

Figure 5:
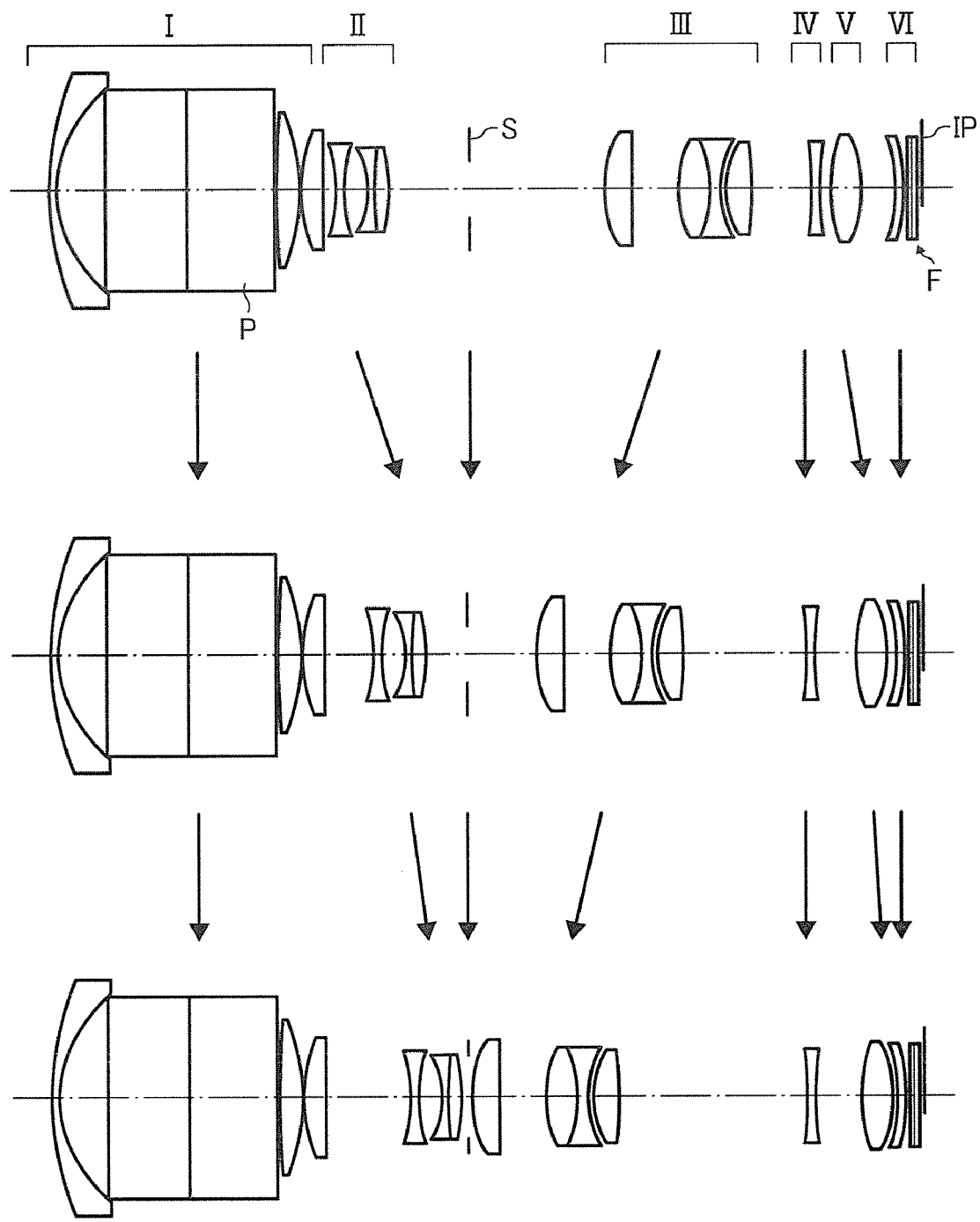
FIG. 5 illustrates a structure of a zoom lens unit according to a second embodiment of the present invention and displacements of lens groups when changing magnification.

FIG. 5 illustrates a second embodiment of a zoom lens unit according to the present invention. The second embodiment concerns a second example explained later.

FIG. 5 illustrates a structure of a zoom lens unit including a plurality of lens groups and displacements of the plurality of lens groups when changing magnification, similar to FIG. 1.

As illustrated in FIG. 5, the zoom lens unit according to the second embodiment includes, in order from an object side to an image side: a first lens group (I) having a positive refracting power; a second lens group (II) having a negative refracting power; a third lens group (III) having a positive refracting power; a fourth lens group (IV) having a negative refracting power; a fifth lens group (V) having a positive refracting power; and a sixth lens group (VI) having a negative refracting power. An aperture stop (S) is disposed between the second lens group (II) and the third lens group (III).

When changing magnification from a wide-angle end to a telephoto end, the second lens group (II), the third lens group (III) and the fifth lens group (V) are moved. In other words, a distance between the first lens group (I) and the second lens group (II) increases by a displacement of the second lens group (II) to the image side. In addition, a distance between the second lens group (II) and the third lens group (III) decreases by the displacement of the second lens group (II) to the image side and a displacement of the third lens group (III) to the object side, and a distance between the third lens group (III) and the fourth lens group (IV) increases by the displacement of the third lens group (III) to the object side. And, a distance between the fourth lens group (IV) and the fifth lens group (V) increases, while a distance between the fifth lens group (V) and the sixth lens group (VI) decreases, by a displacement of the fifth lens group (V) to the image side.

In the present embodiment, the first lens group (I), the aperture stop (S), the fourth lens group (IV) and the sixth lens group (VI) are fixed when changing magnification.

The first lens group (I) has a negative meniscus lens, a prism (P), and two positive lenses, disposed in this order from the object side to the image side. The negative meniscus lens has a convex surface toward the object side and an aspheric surface on an image surface side.

The second lens group (II) has a first biconcave negative lens having an aspheric surface on the image surface side, a cemented lens formed by a second biconcave negative lens and a biconvex positive lens, disposed in this order from the object side.

The aperture stop (S) is fixed and disposed between the second lens group (II) and the third lens group (III).

The third lens group (III) has a first biconvex positive lens, a cemented lens formed by a second biconvex positive lens and a biconcave negative lens, and a third biconvex positive lens, disposed in this order from the object side. The first biconvex positive lens has an aspheric surface on the object side, and a stronger convex surface of the first biconvex positive lens towards the object side.

The fourth lens group (IV) has one biconcave negative lens which includes an aspheric surface on the image surface side.

The fifth lens group (V) has one biconvex positive lens which includes an aspheric surface on the object side.

The sixth lens group (VI) has one negative meniscus lens which includes an aspheric surface on the object side, and a convex surface of the negative meniscus lens toward the image surface side.

Figure 9:
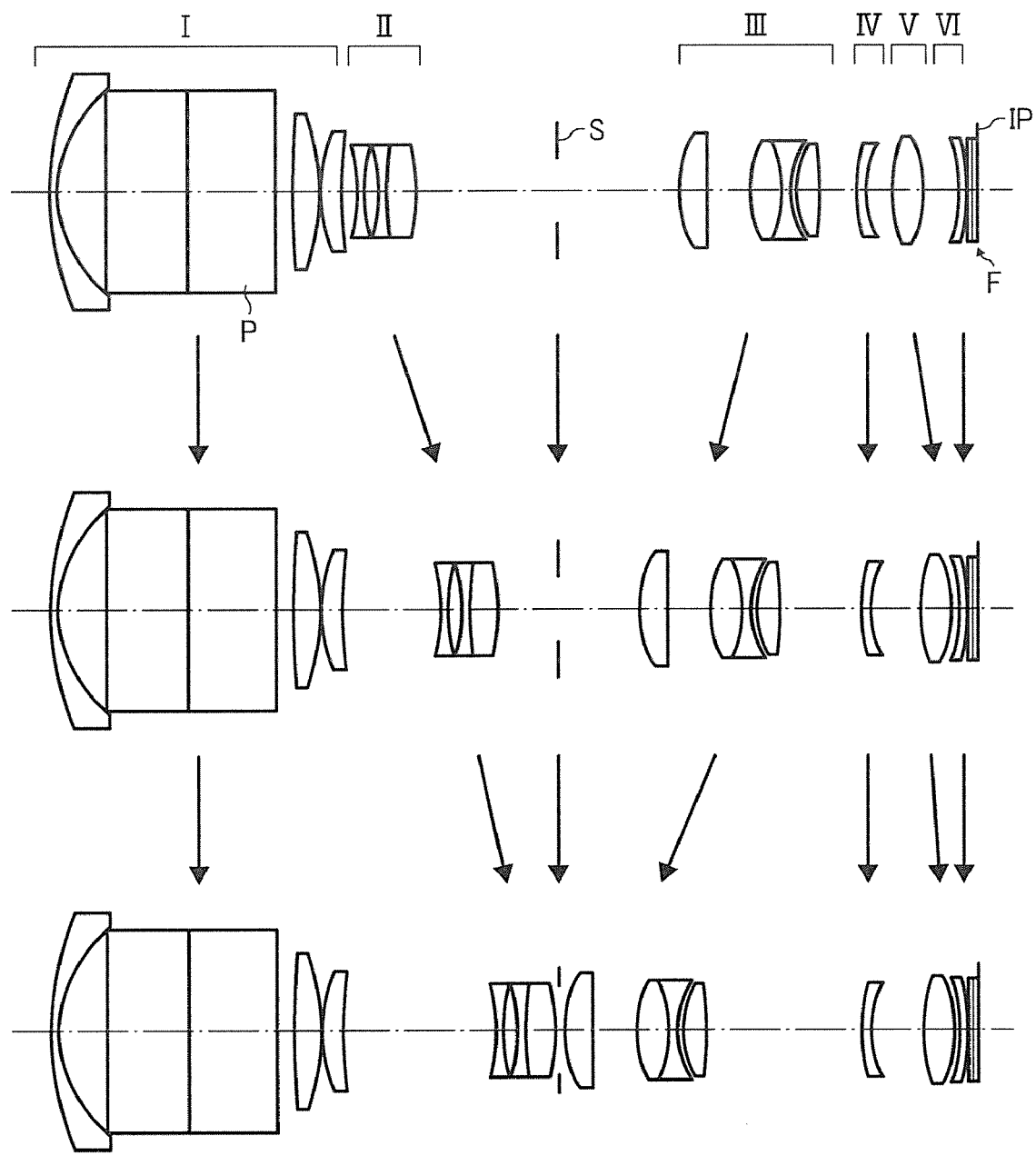
FIG. 9 illustrates a structure of a zoom lens unit according to a third embodiment of the present invention and displacements of lens groups when changing magnification.

FIG. 9 illustrates a third embodiment of a zoom lens unit according to the present invention. The third embodiment concerns a third example explained later.

FIG. 9 illustrates a structure of a zoom lens unit including a plurality of lens groups and displacements of the plurality of lens groups when changing magnification, similar to FIG. 1.

As illustrated in FIG. 9, the zoom lens unit according to the third embodiment includes, in order from an object side to an image side: a first lens group (I) having a positive refracting power; a second lens group (II) having a negative refracting power; a third lens group (III) having a positive refracting power; a fourth lens group (IV) having a negative refracting power; a fifth lens group (V) having a positive refracting power; and a sixth lens group (VI) having a negative refracting power. An aperture stop (S) is disposed between the second lens group (II) and the third lens group (III).

When changing magnification from a wide-angle end to a telephoto end, the second lens group (II), the third lens group (III) and the fifth lens group (V) are moved. In other words, a distance between the first lens group (I) and the second lens group (II) increases by a displacement of the second lens group (II) to the image side. In addition, a distance between the second lens group (II) and the third lens group (III) decreases by the displacement of the second lens group (II) to the image side and a displacement of the third lens group (III) to the object side, and a distance between the third lens group (III) and the fourth lens group (IV) increases by the displacement of the third lens group (III) to the object side. And, a distance between the fourth lens group (IV) and the fifth lens group (V) increases, while a distance between the fifth lens group (V) and the sixth lens group (VI) decreases, by a displacement of the fifth lens group (V) to the image side.

In the present embodiment, the first lens group (I), the aperture stop (S), the fourth lens group (IV) and the sixth lens group (VI) are fixed when changing magnification.

The first lens group (I) has a negative meniscus lens, a prism (P), and two positive lenses, disposed in this order from the object side to the image side. The negative meniscus lens has a convex surface toward the object side and an aspheric surface on an image surface side.

The second lens group (II) has a first biconcave negative lens having an aspheric surface on the image surface side, a cemented lens formed by a second biconcave negative lens and a biconvex positive lens, disposed in this order from the object side.

The aperture stop (S) is disposed between the second lens group (II) and the third lens group (III).

The third lens group (III) has a positive meniscus lens, a cemented lens formed by a first biconvex positive lens and a biconcave negative lens, and a second biconvex positive lens, disposed in this order from the object side. The positive meniscus lens has an aspheric surface on the object side, and a stronger convex surface of the positive meniscus lens towards the object side.

The fourth lens group (IV) has one negative meniscus lens which includes an aspheric surface on the image surface side and a convex surface on the object side.

The fifth lens group (V) has one biconvex positive lens which includes an aspheric surface on the object side.

The sixth lens group (VI) has one negative meniscus lens which includes an aspheric surface on the object side, and a convex surface of the negative meniscus lens toward the image surface side.

Figure 13:
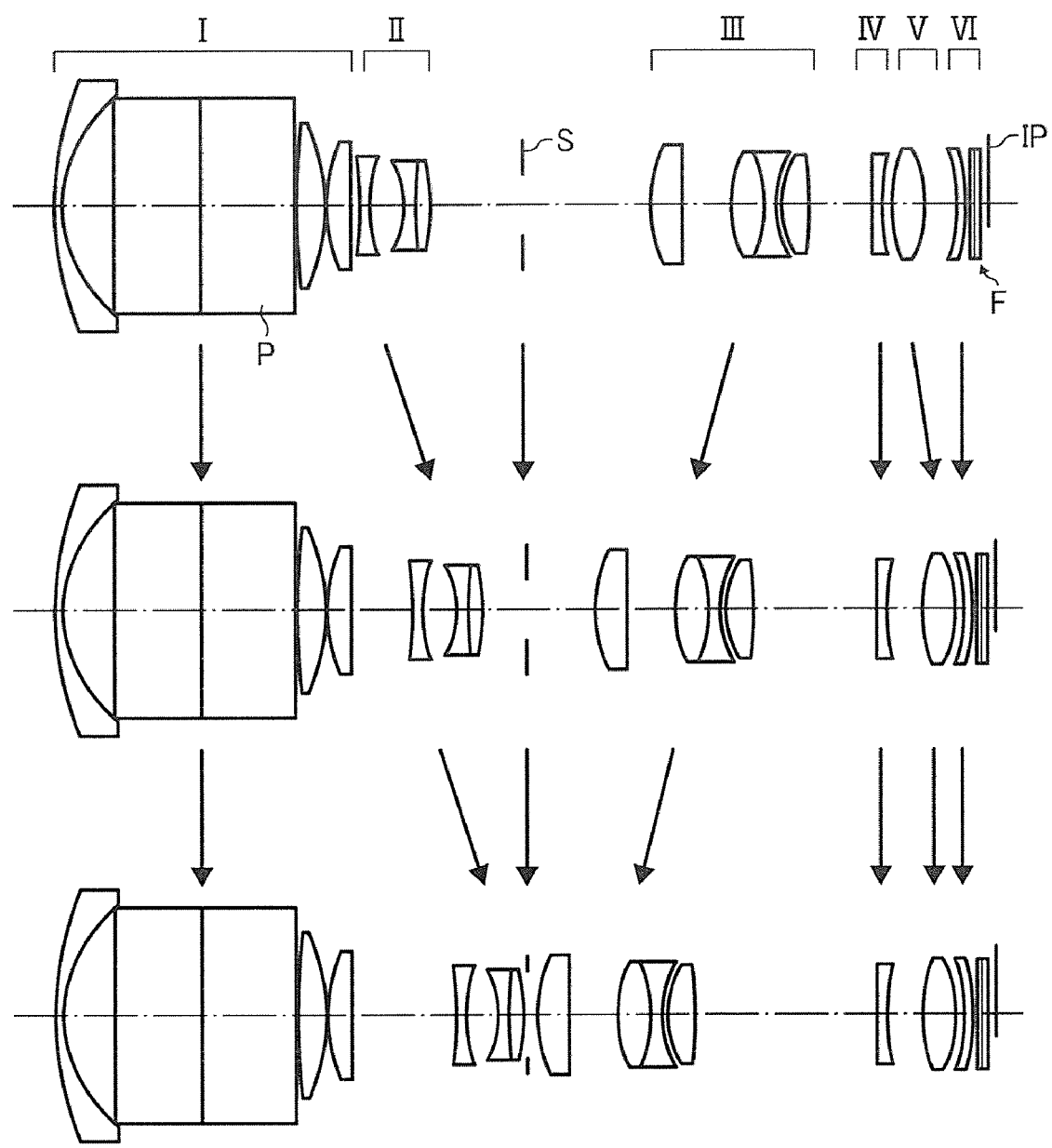
FIG. 13 is a figure illustrating a structure of a zoom lens unit according to a fourth embodiment of the present invention and displacements of lens groups when changing magnification.

FIG. 13 illustrates a fourth embodiment of a zoom lens unit according to the present invention. The fourth embodiment concerns a fourth example explained later.

FIG. 13 illustrates a structure of a zoom lens unit including a plurality of lens groups and displacements of the plurality of lens groups when changing magnification, similar to FIG. 1.

As illustrated in FIG. 13, the zoom lens unit according to the fourth embodiment includes, in order from an object side to an image side: a first lens group (I) having a positive refracting power; a second lens group (II) having a negative refracting power; a third lens group (III) having a positive refracting power; a fourth lens group (IV) having a negative refracting power; a fifth lens group (V) having a positive refracting power; and a sixth lens group (VI) having a negative refracting power. An aperture stop (S) is disposed between the second lens group (II) and the third lens group (III).

When changing magnification from a wide-angle end to a telephoto end, the second lens group (II), the third lens group (III) and the fifth lens group (V) are moved. In other words, a distance between the first lens group (I) and the second lens group (II) increases by a displacement of the second lens group (II) to the image side. In addition, a distance between the second lens group (II) and the third lens group (III) decreases by the displacement of the second lens group (II) to the image side and a displacement of the third lens group (III) to the object side, and a distance between the third lens group (III) and the fourth lens group (IV) increases by the displacement of the third lens group (III) to the object side. And, a distance between the fourth lens group (IV) and the fifth lens group (V) increases, while a distance between the fifth lens group (V) and the sixth lens group (VI) decreases, by a displacement of the fifth lens group (V) to the image side.

In the present embodiment, the first lens group (I), the aperture stop (S), the fourth lens group (IV) and the sixth lens group (VI) are fixed when changing magnification.

The first lens group (I) has a negative meniscus lens, a prism (P), and two positive lenses, disposed in this order from the object side to the image side. The negative meniscus lens has a convex surface toward the object side and an aspheric surface on an image surface side.

The second lens group (II) has a first biconcave negative lens having an aspheric surface on the image surface side, a cemented lens formed by a second biconcave negative lens and a biconvex positive lens, disposed in this order from the object side.

The aperture stop (S) is fixed and disposed between the second lens group (II) and the third lens group (III).

The third lens group (III) has a first biconvex positive lens, a cemented lens formed by a second biconvex positive lens and a biconcave negative lens, and a third biconvex positive lens, disposed in this order from the object side. The first biconvex positive lens has an aspheric surface on the object side, and a stronger convex surface of the first biconvex positive lens towards the object side.

The fourth lens group (IV) has one biconcave negative lens which includes an aspheric surface on the image surface side.

The fifth lens group (V) has one biconvex positive lens which includes an aspheric surface on the object side.

The sixth lens group (VI) has one negative meniscus lens which includes an aspheric surface on the object side, a convex surface of the negative meniscus lens toward the image surface side.

The prism (P) provided in the first lens group (I), as illustrated in FIGS. 1, 5, 9 and 13, works as the reflecting optical element which is configured to bend the light path. Though an actual light path is bent in the first lens group (I) by the "reflection of the prism" to obtain a predetermined light path length, due to the existence of the prism (P), a state where the light path is developed linearly is illustrated in the figures to avoid complication of the figures.

A parallel plate (F), corresponding to a cover glass that protects, for example, an image pickup device and a low-pass filter which is configured to cut spatial frequency equal to or more than a limit resolution of a solid-state image sensor such as a CCD provided on the image surface, is disposed between the sixth lens group (VI) and the image plane (IP), as illustrated in FIGS. 1, 5, 9 and 13. For example, the parallel plate (F) includes two pieces of plates.

As stated above, the refracting power of the sixth lens group is negative in the four embodiments explained, also the refracting power of the sixth lens group can be positive. When the sixth lens group with the positive refracting power is used, it becomes easy to control an exit pupil position.

Figure 17:
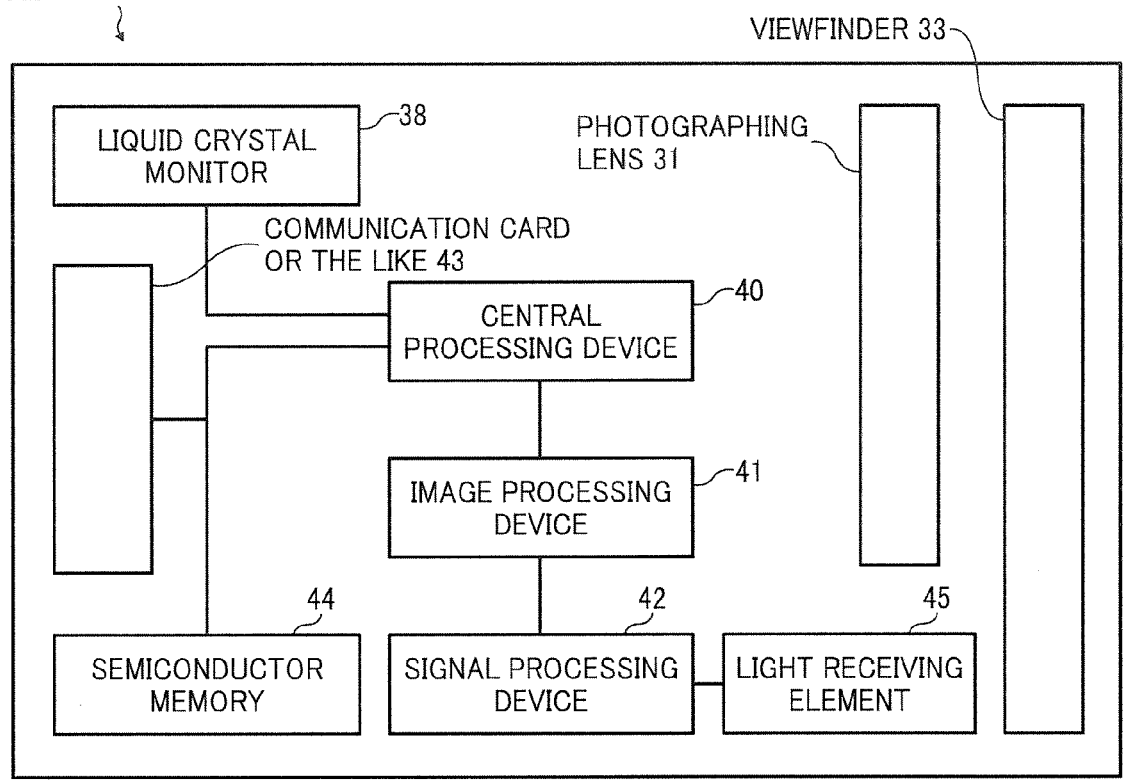
FIG. 17 is a system chart illustrating an embodiment of a digital camera according to an example of an imaging apparatus of the present invention.

FIG. 17 illustrates a system chart of a digital camera according to an embodiment of an imaging apparatus of the present invention. A digital camera 30 includes a photographing lens 31 and a light receiving element 45 (an area sensor) which is an image pickup device, as illustrated in FIG. 17. An image of a photographing object by the photographing lens 31 is formed on the light receiving element 45 and is read by the light receiving element 45.

Here the light receiving element 45 is a color imaging device.

As the photographing lens 31, for example, any one of the above-mentioned zoom lens units, more particularly, a zoom lens unit explained in after-mentioned examples is used. In addition, as the light receiving element 45, a light receiving element having 5 million to 8 million pixels or more, for example, a CCD (Charge-Coupled Device) area sensor having the opposite angle length of light receiving area, 9.1 mm, the pixel pitch, 2.35 μm, and about 7 million pixels, or a CCD area sensor having the opposite angle length of light receiving area, 9.1 mm, the pixel pitch, 2 μm, and about 10 million pixels, or the like can be used. A magnification change of a viewfinder 33 is carried out in synchronization with a zooming of the photographing lens 31.

As illustrated in FIG. 17, an output from the light receiving element 45 is processed by a signal processing device 42 which receives a control of a central processing device 40, and is converted into digital information. Image information digitized by the signal processing device 42 is recorded in a semiconductor memory 44 after receiving a predetermined image processing in an image processing device 41, which receives a control of the central processing device 40. A liquid crystal monitor 38 can display an image during photographing and also an image recorded in the semiconductor memory 44. Moreover, the image recorded in the semiconductor memory 44 can be exported by using a communication card 43, etc.

In the zoom lens unit according to the present invention which is used as the photographing lens 31, the light path is bent by the prism provided in the first lens group, therefore the light path is bent in a casing of the digital camera. Moreover, no change will occur on an outer shape of the camera by a magnification change operation, since the first lens group is fixed when changing magnification.

When displaying the image recorded in the semiconductor memory 44 on the liquid crystal monitor 38, and when exporting the image by using the communication card 43, etc., operation buttons can be used. The semiconductor memory 44, the communication card 43, etc., are inserted into the exclusive-use or general-purpose slots for use. In addition, the viewfinder 33 can be omitted and the liquid crystal monitor 38 can be used to monitor an image for photographing.

Hereinafter, four examples of the zoom lens unit according to the present invention will be explained in detail.

Meanings of signs in the examples are as follows:
f: focal length of an entire zoom lens unit system
F: F-number
ω: half-field angle (degree)
R: curvature radius
D: surface distance
$N_d$: refractive index of a medium at "d line" (λ=587.6 nm)
$v_d$: Abbe number In addition, a surface number represents a sequence of the surface (including a surface of the aperture) from the object side, and the surface distance D represents a distance between the surfaces on an optical axis. Here a refractive index of the air is 1.00000 and thus is omitted.

The aspheric surface in the examples can be expressed by the following equation, using an inverse number of paraxial curvature radius (paraxial curvature), C, a height from the optical axis, H, a cone constant number, K, and aspheric surface coefficients of high-order, A4, A6 . . . , and adopting a depth in the optical axis direction as X.

$$X = CH^2/\{1+\sqrt{(1-(1+K)C^2H^2)}\} + A4 \cdot H^4 + A6 \cdot H^6 + A8 \cdot H^8 + A10 \cdot H^{10} + A12 \cdot H^{12} + A14 \cdot H^{14} + A16 \cdot H^{16} + A18 \cdot H^{18} + \ldots$$

In original values of the following examples, in general, "mm" is used as a unit of such as the focal length, the curvature radius, the surface distance and other lengths in each original data. But it is not limited to this, since equivalent optical performances can be obtained regardless of an optical system being expanded proportionally or being reduced proportionally.

EXAMPLE 1 f = 5.2-35.0, F = 3.41-5.91, ω = 38.9-6.8

| Surface No. | R | D | $N_d$ | $v_d$ |
|---|---|---|---|---|
| 1 | 28.71520 | 0.70000 | 1.92286 | 18.90 |
| 2 | 10.60780 | 4.30000 | | |
| 3 | ∞ | 8.00000 | 1.88300 | 40.76 |
| 4 | ∞ | 8.00000 | 1.88300 | 40.76 |
| 5 | ∞ | 0.10000 | | |
| 6 | 71.87173 | 2.64346 | 1.51633 | 64.14 |
| 7 | −16.44232 | 0.10000 | | |
| 8 | 16.69061 | 1.85042 | 1.64000 | 60.08 |
| 9 | 70.74017 | Variable(A) | | |
| 10 | −18.06772 | 0.80000 | 2.00330 | 28.27 |
| 11 | 13.70265 | 1.34310 | | |
| 12 | −8.40441 | 0.80000 | 1.58913 | 61.15 |
| 13 | 35.84699 | 1.37144 | 1.92286 | 18.90 |
| 14 | −14.82566 | Variable(B) | | |
| 15 | ∞ (Aperture) | Variable(C) | | |
| 16 | 10.40018 | 2.55979 | 1.71700 | 47.93 |
| 17 | 695.19360 | 4.38175 | | |

-continued $f = 5.2\text{-}35.0, F = 3.41\text{-}5.91, \omega = 38.9\text{-}6.8$

| Surface No. | R | D | $N_d$ | $v_d$ |
|---|---|---|---|---|
| 18 | 10.62658 | 3.03220 | 1.61800 | 63.33 |
| 19 | −8.68306 | 0.80000 | 1.90366 | 31.32 |
| 20 | 7.41539 | 0.47196 | | |
| 21 | 7.95016 | 2.41954 | 1.48749 | 70.24 |
| 22 | −28.32715 | Variable(D) | | |
| 23 | 21.13305 | 0.80000 | 1.92286 | 18.90 |
| 24 | 10.38558 | Variable(E) | | |
| 25 | 20.33524 | 3.00000 | 1.48749 | 70.24 |
| 26 | −11.38514 | Variable(F) | | |
| 27 | −12.24222 | 0.80000 | 1.77250 | 49.60 |
| 28 | −20.52607 | 0.37154 | | |
| 29 | ∞ | 0.30000 | 1.52300 | 58.00 |
| 30 | ∞ | 0.10000 | | |
| 31 | ∞ | 0.50000 | 1.50000 | 64.00 |
| 32 | ∞ | | | |

Aspheric Surface
Second Surface
K=0.00000E+00
A4=−3.94417E−05
A6=−4.97773E−07
A8=4.02699E−09
A10=−5.50352E−11
Eleventh Surface
K=0.00000E+00
A4=−9.62647E−05
A6=5.51477E−07
A8=−7.04684E−08
A10=1.55863E−09
Sixteenth Surface
K=0.00000E+00
A4=−4.74120E−05
A6=1.07836E−07
A8=−5.65417E−09
A10=6.42398E−11
Twenty-Second Surface
K=0.00000E+00
A4=1.93283E−04
A6=1.97214E−06
A8=−2.90612E−07
A10=5.81603E−09
Twenty-Fourth Surface
K=0.00000E+00
A4=3.10126E−04
A6=3.13472E−06
A8=8.92131E−07
A10=−3.31098E−08
Twenty-Fifth Surface
K=0.00000E+00
A4=1.54388E−04
A6=1.44637E−05
A8=4.02382E−08
A10=−9.54432E−09
Twenty-Seventh Surface
K=0.00000E+00
A4=5.46346E−04
A6=−2.99878E−05
A8=6.59274E−07

In the above description, for example, "6.59274E−07" represents "6.59274×10$^{−7}$". It is similar in the following other examples.

| Variable Amount | | | |
|---|---|---|---|
| | Wide-angle end | Intermediate focal length | Telephoto end |
| A | 1.174 | 6.241 | 10.769 |
| B | 10.164 | 5.098 | 0.569 |
| C | 12.128 | 6.705 | 0.500 |
| D | 2.688 | 8.111 | 14.316 |
| E | 2.410 | 5.032 | 5.150 |
| F | 3.228 | 0.606 | 0.488 |

Values of Parameters in Each Condition
f1=15.25
f2=−8.93
fw=5.2
ft=35.0
f1/√(fw×ft)=1.13
f2/√(fw>ft)=−0.66
Y'=4.2
L1=13
L2=69
Lg1=25.7
fL1=−18.57
T=82
Tap=41.3
fw/Y'=1.24
L1/L2=0.19
Lg1/fw=4.94
L2/ft=1.97
|fL1/fw|=3.57
Tap/T=0.5

Figure 2:
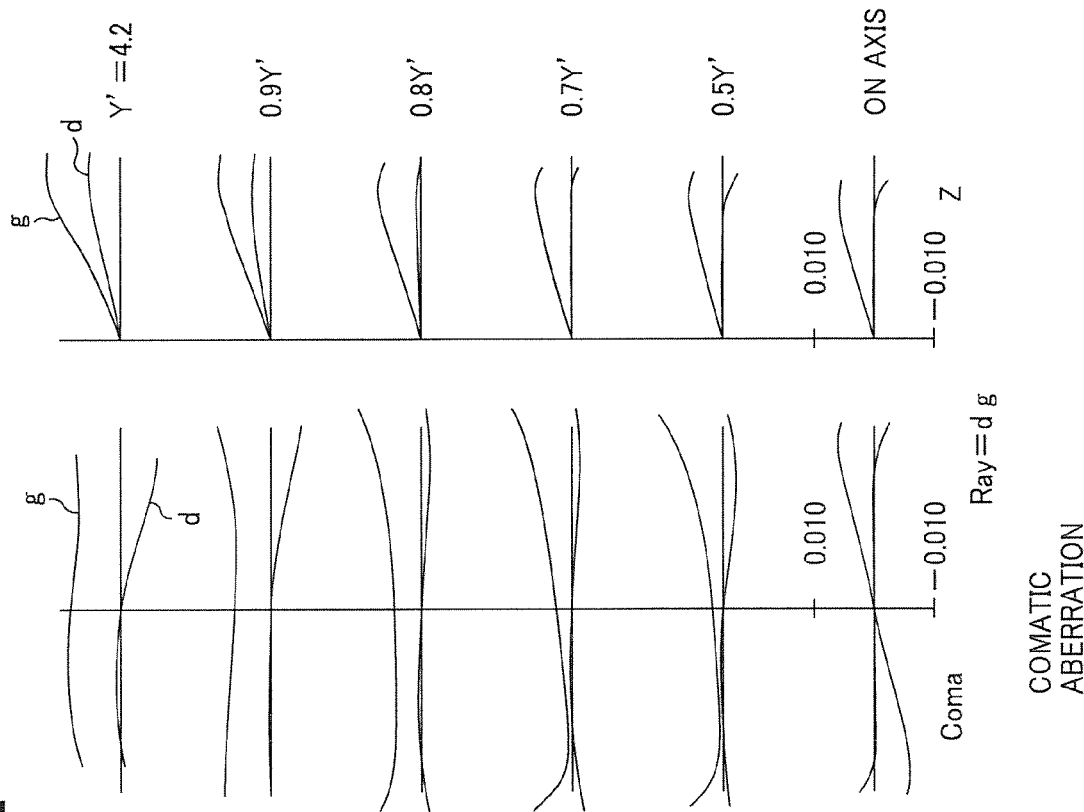
FIG. 2 illustrates aberration diagrams at a wide-angle end of the zoom lens unit according to the first embodiment.
Figure 2:
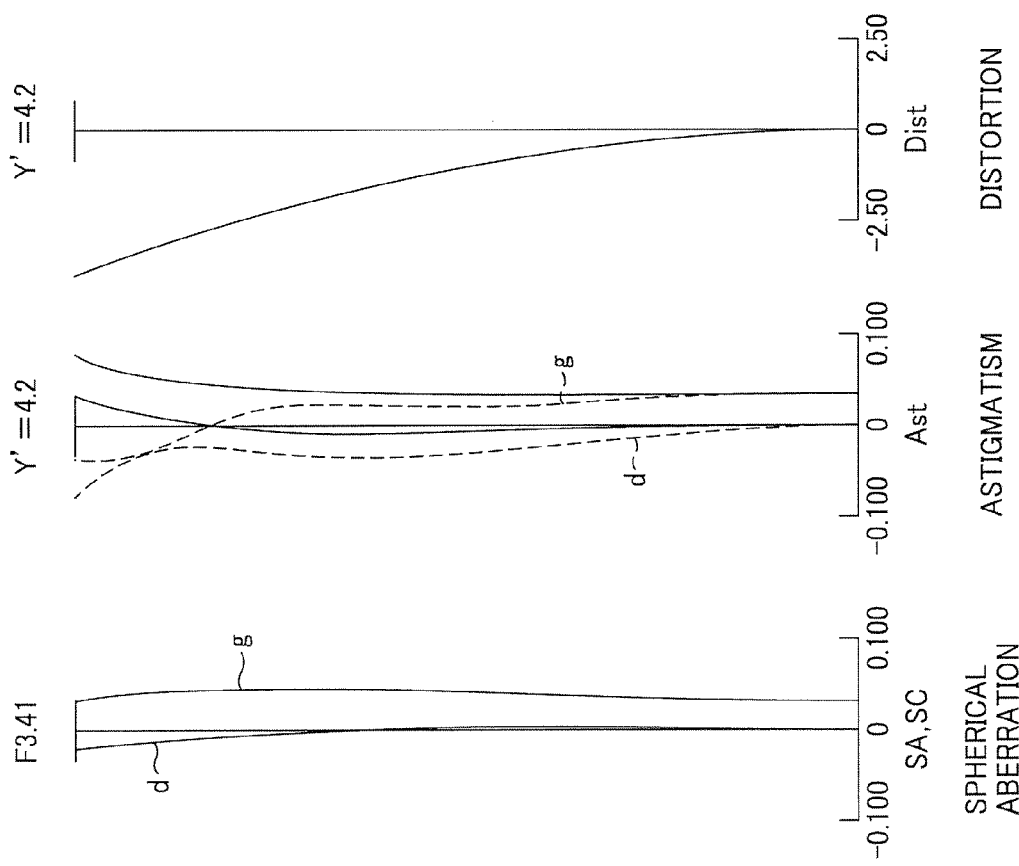
Figure 3:
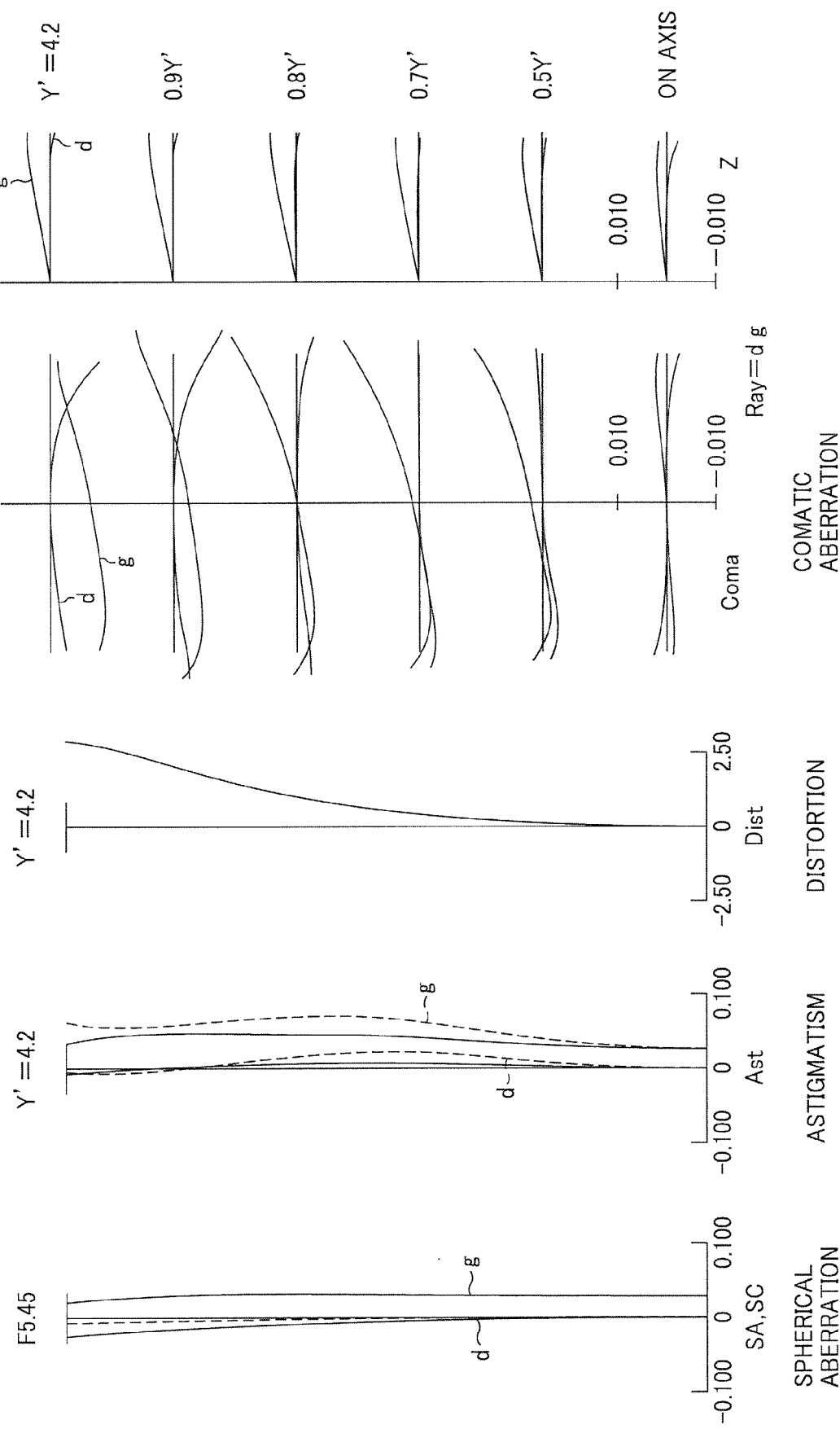
FIG. 3 illustrates aberration diagrams at a specific intermediate focal length of the zoom lens unit according to the first embodiment.
Figure 4:
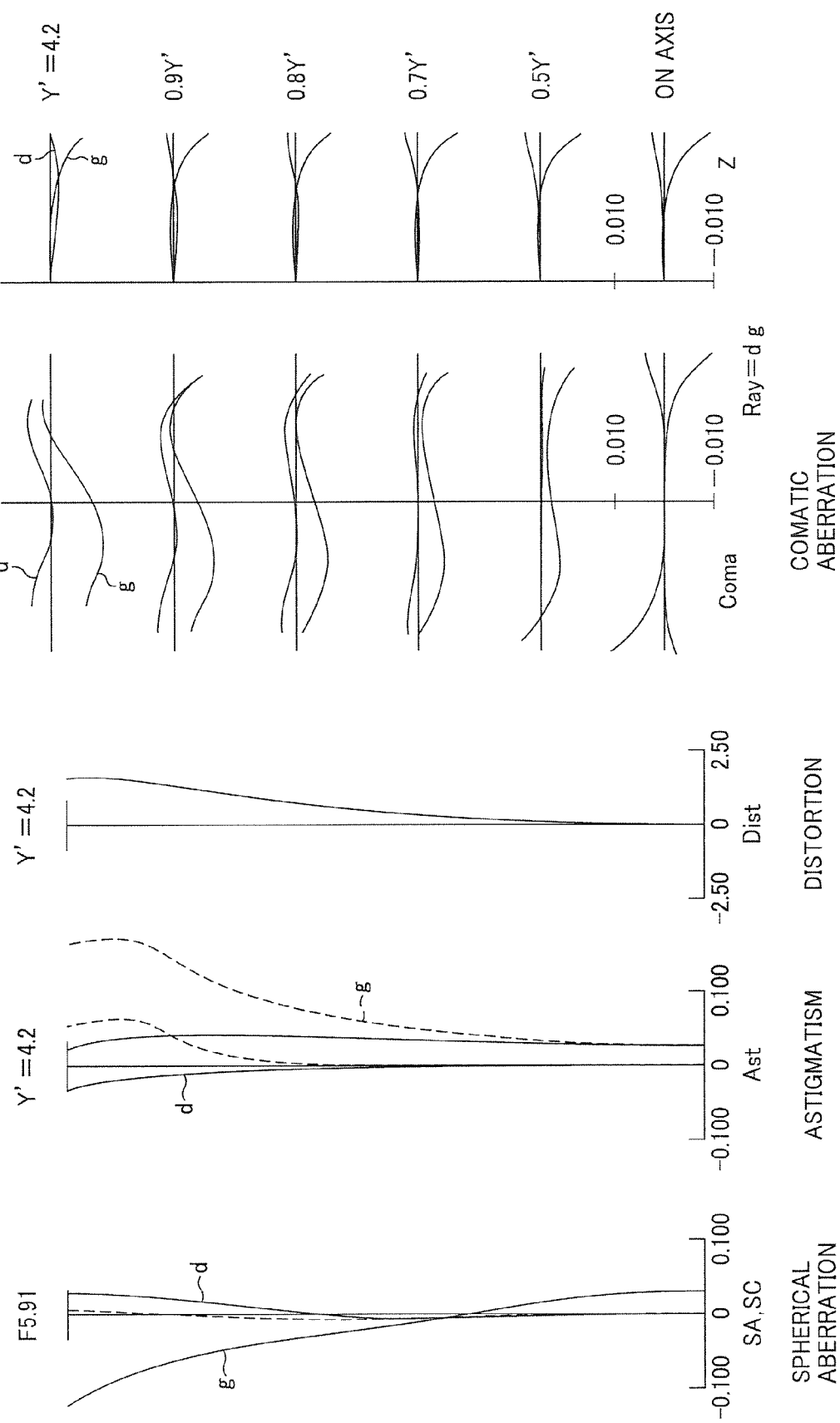
FIG. 4 illustrates aberration diagrams at a telephoto end of the zoom lens unit according to the first embodiment.

FIGS. 2, 3 and 4 illustrate various aberration diagrams of the zoom lens unit according to the first example, at the wide-angle end, the specific middle focal length and the telephoto end, respectively.

In addition, the solid lines in the astigmatic diagrams illustrate sagittal image planes, and the dashed lines in the astigmatic diagrams illustrate meridional image planes. Each of comatic aberration diagrams in the figures illustrates a comatic aberration at each image height. Moreover, in each aberration diagram, "d" indicates an aberration at "d line" (λ=587.6 nm), and "g" indicates an aberration at "g line". The same is true in the following examples.

EXAMPLE 2

$f = 5.2\text{-}35.0, F = 3.33\text{-}5.99, \omega = 38.9\text{-}6.8$

| Surface No. | R | D | $N_d$ | $v_d$ |
|---|---|---|---|---|
| 1 | 24.29547 | 0.70000 | 1.92286 | 18.90 |
| 2 | 9.75657 | 4.29950 | | |
| 3 | ∞ | 8.00000 | 1.88300 | 40.76 |
| 4 | ∞ | 8.00000 | 1.88300 | 40.76 |
| 5 | ∞ | 0.10000 | | |
| 6 | 200.55230 | 2.42139 | 1.51633 | 64.14 |
| 7 | −14.69376 | 0.10000 | | |
| 8 | 15.42392 | 2.12568 | 1.64000 | 60.08 |
| 9 | 496.30189 | Variable(A) | | |
| 10 | −20.83647 | 0.80000 | 2.00330 | 28.27 |
| 11 | 11.05282 | 2.25137 | | |
| 12 | −7.66956 | 0.80022 | 1.58913 | 61.15 |
| 13 | 41.04884 | 1.22166 | 1.92286 | 18.90 |
| 14 | −14.90628 | Variable(B) | | |

-continued

| f = 5.2-35.0, F = 3.33-5.99, ω = 38.9-6.8 | | | | |
|---|---|---|---|---|
| Surface No. | R | D | $N_d$ | $v_d$ |
| 15 | ∞ (Aperture) | Variable(C) | | |
| 16 | 10.68546 | 2.65245 | 1.71700 | 47.93 |
| 17 | −926.63252 | 4.14070 | | |
| 18 | 11.96583 | 3.20000 | 1.61800 | 63.33 |
| 19 | −8.48903 | 0.80000 | 1.90366 | 31.32 |
| 20 | 8.29429 | 0.42399 | | |
| 21 | 8.50827 | 2.57944 | 1.48749 | 70.24 |
| 22 | −22.42544 | Variable(D) | | |
| 23 | −32.79524 | 0.80000 | 1.92286 | 18.90 |
| 24 | 36.06477 | Variable(E) | | |
| 25 | 20.95609 | 3.00000 | 1.48749 | 70.24 |
| 26 | −10.32363 | Variable(F) | | |
| 27 | −14.44984 | 0.80000 | 1.77250 | 49.60 |
| 28 | −22.23806 | 0.11068 | | |
| 29 | ∞ | 0.30000 | 1.52300 | 58.00 |
| 30 | ∞ | 0.10000 | | |
| 31 | ∞ | 0.50000 | 1.50000 | 64.00 |
| 32 | ∞ | | | |

Aspheric Surface
Second Surface
K=0.00000E+00
A4=−2.35463E−05
A6=−7.98971E−07
A8=8.43797E−09
A10=−1.02004E−10
Eleventh Surface
K=0.00000E+00
A4=−1.22211E−04
A6=−6.95451E−08
A8=−2.75080E−08
A10=−7.03527E−10
Sixteenth Surface
K=0.00000E+00
A4=−4.53961E−05
A6=1.71251E−07
A8=−4.14722E−09
A11=4.77677E−11
Twenty-Second Surface
K=0.00000E+00
A4=2.10011E−04
A6=2.54274E−06
A8=−1.70205E−07
A10=2.68822E−09
Twenty-Fourth Surface
K=0.00000E+00
A4=3.15812E−04
A6=2.37810E−06
A8=6.93382E−07
A10=−2.86333E−08
Twenty-Fifth Surface
K=0.00000E+00
A4=1.47734E−04
A6=1.57338E−05
A8=−1.57764E−07
A10=−8.67412E−09
Twenty-Seventh Surface
K=0.00000E+00
A4=3.25997E−04
A6=−5.01278E−05
A8=1.45864E−06

| Variable Amount | | | |
|---|---|---|---|
| | Wide-angle end | Intermediate focal length | Telephoto end |
| A | 0.968 | 4.567 | 8.035 |
| B | 7.573 | 3.973 | 0.506 |
| C | 12.508 | 6.489 | 0.500 |
| D | 5.119 | 11.138 | 17.127 |
| E | 1.000 | 3.848 | 4.653 |
| F | 3.982 | 1.133 | 0.329 |

Values of Parameters in Each Condition
f1=12.00
f2=−7.57
fw=5.2
ft=35.0
f1/√(fw×ft)=0.89
f2/√(fw×ft)=−0.56
fw=5.2
fT=35
Y'=4.2
L1=13
L2=68.5
Lg1=25.75
fL1=−18.08
T=81.5
Tap=39.4
fw/Y'=1.24
L1/L2=0.19
Lg1/fw=4.95
L2/ft=1.96
|fL1/fw|=3.48
Tap/T=0.48

Figure 6:
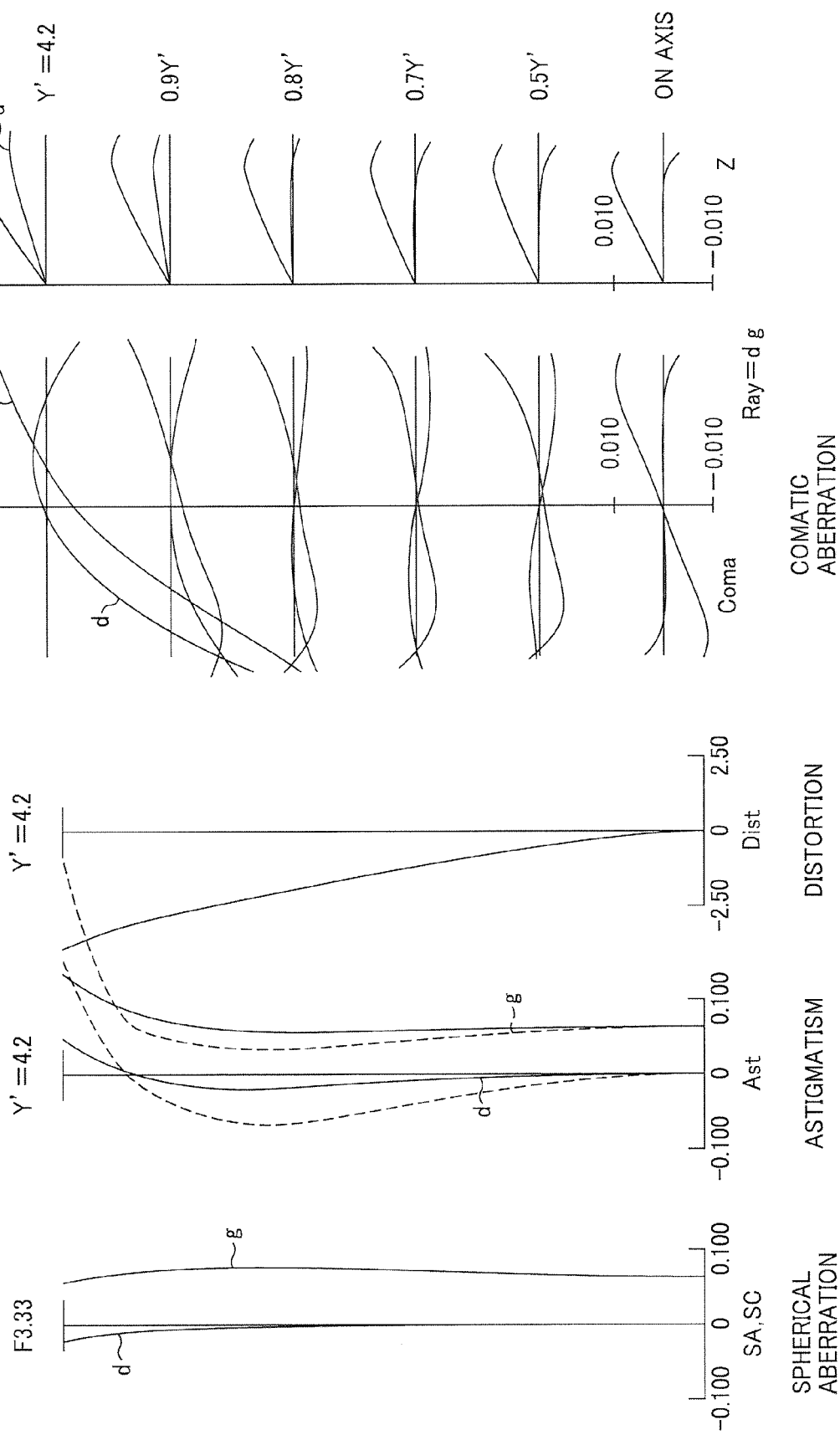
FIG. 6 illustrates aberration diagrams at a wide-angle end of the zoom lens unit according to the second embodiment.
Figure 7:
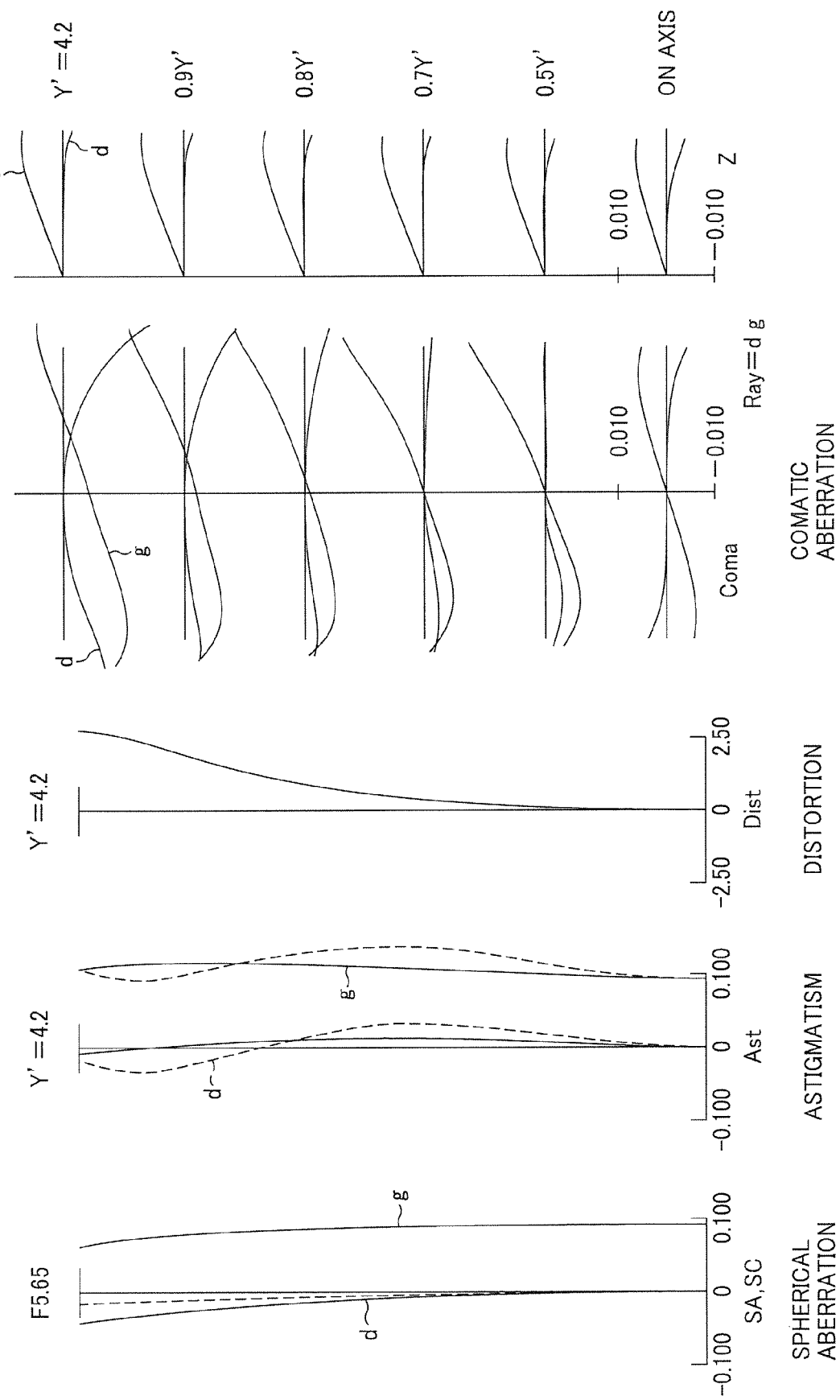
FIG. 7 illustrates aberration diagrams at a specific intermediate focal length of the zoom lens unit according to the second embodiment.
Figure 8:
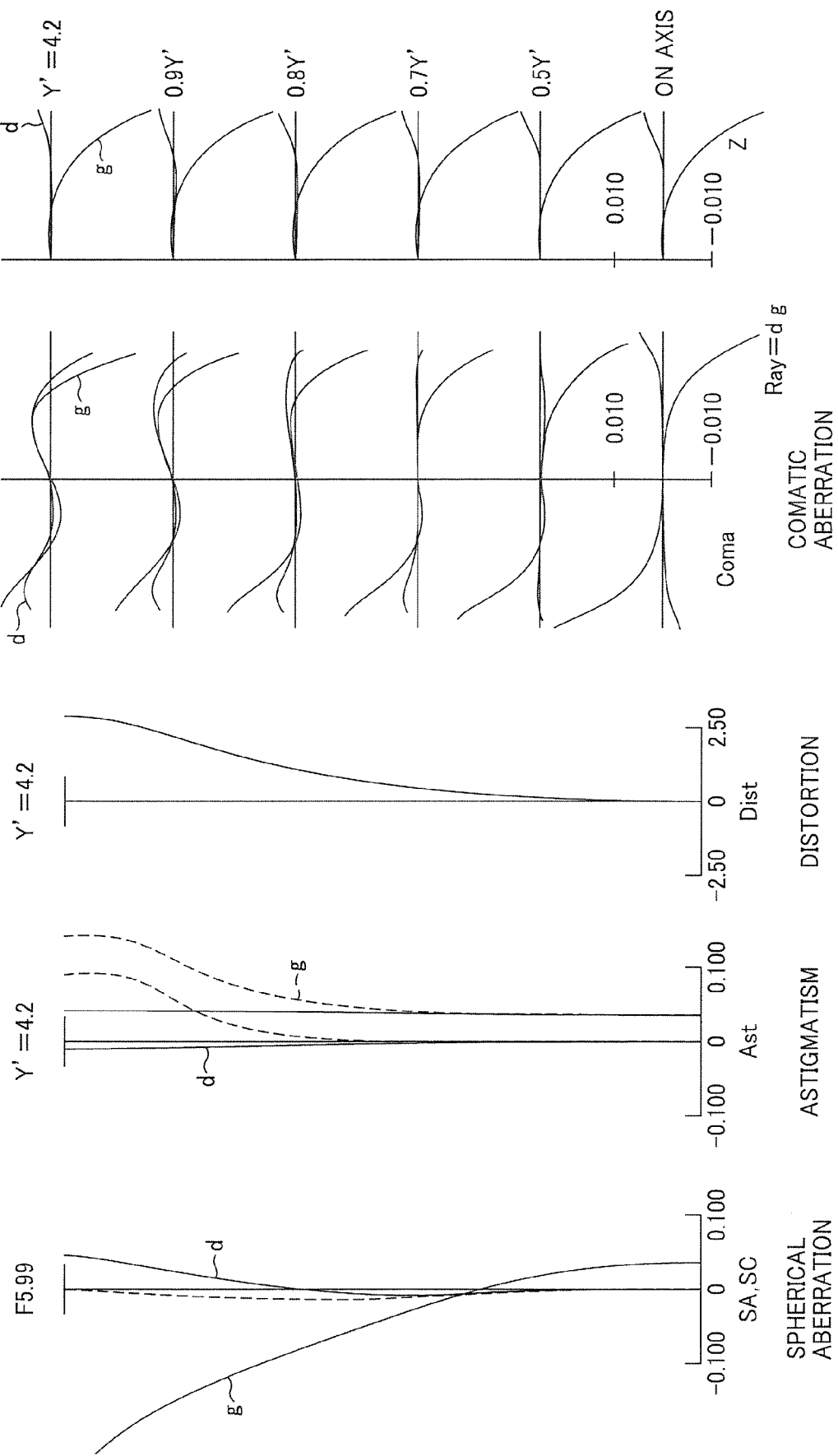
FIG. 8 illustrates aberration diagrams at a telephoto end of the zoom lens unit according to the second embodiment.

FIGS. 6, 7 and 8 illustrate various aberration diagrams of the zoom lens unit according to the second example, at the wide-angle end, the specific middle focal length and the telephoto end, respectively.

EXAMPLE 3

| f = 5.2-35.0, F = 3.39-5.80, ω = 38.9-6.8 | | | | |
|---|---|---|---|---|
| Surface No. | R | D | $N_d$ | $v_d$ |
| 1 | 32.03396 | 0.69892 | 1.92286 | 18.90 |
| 2 | 10.76472 | 4.30259 | | |
| 3 | ∞ | 8.00000 | 1.88300 | 40.76 |
| 4 | ∞ | 8.00000 | 1.88300 | 40.76 |
| 5 | ∞ | 1.75841 | | |
| 6 | 115.94523 | 2.93171 | 1.51633 | 64.14 |
| 7 | −16.97664 | 0.09982 | | |
| 8 | 18.09178 | 1.82222 | 1.64000 | 60.08 |
| 9 | 47.88622 | Variable(A) | | |
| 10 | −18.80287 | 0.80040 | 2.00330 | 28.27 |
| 11 | 17.51536 | 1.31481 | | |
| 12 | −10.84426 | 0.80000 | 1.58913 | 61.15 |
| 13 | 30.97094 | 2.75616 | 1.92286 | 18.90 |
| 14 | −19.18998 | Variable(B) | | |
| 15 | ∞ (Aperture) | Variable(C) | | |
| 16 | 10.41903 | 2.52085 | 1.71700 | 47.93 |
| 17 | 464.64637 | 4.42532 | | |
| 18 | 9.76213 | 2.75103 | 1.61800 | 63.33 |
| 19 | −9.30396 | 0.80000 | 1.90366 | 31.32 |
| 20 | 6.70577 | 0.55354 | | |
| 21 | 7.65800 | 2.14226 | 1.48749 | 70.24 |

-continued f = 5.2-35.0, F = 3.39-5.80, ω = 38.9-6.8

| Surface No. | R | D | $N_d$ | $v_d$ |
|---|---|---|---|---|
| 22 | −40.70216 | Variable(D) | | |
| 23 | 20.37002 | 0.79978 | 1.92286 | 18.90 |
| 24 | 9.00942 | Variable(E) | | |
| 25 | 30.29651 | 2.99986 | 1.48749 | 70.24 |
| 26 | −9.79500 | Variable(F) | | |
| 27 | −12.24779 | 0.80451 | 1.77250 | 49.60 |
| 28 | −16.18715 | 0.10004 | | |
| 29 | ∞ | 0.30000 | 1.52300 | 58.00 |
| 30 | ∞ | 0.10000 | | |
| 31 | ∞ | 0.50000 | 1.50000 | 64.00 |
| 32 | ∞ | | | |

Aspheric Surface
Second Surface
K=0.00000E+00
A4=−4.00372E−05
A6=−5.29555E−07
A8=5.09620E−09
A10=−6.84250E−11
Eleventh Surface
K=0.00000E+00
A4=−4.18732E−05
A6=8.80211E−07
A8=−8.86591E−08
A10=2.43942E−09
Sixteenth Surface
K=0.00000E+00
A4=−4.08532E−05
A6=5.83588E−08
A8=−6.04882E−09
A10=6.61854E−11
Twenty-Second Surface
K=0.00000E+00
A4=1.02687E−04
A6=−5.99383E−07
A8=−3.0147E−07
A10=4.04148E−09
Twenty-Fourth Surface
K=0.00000E+00
A4=3.91184E−04
A6=6.74675E−06
A8=1.26729E−06
A10=−5.59803E−08
Twenty-Fifth Surface
K=0.00000E+00
A4=1.84460E−04
A6=1.50591E−05
A8=2.64295E−07
A10=−1.77378E−08
Twenty-Seventh Surface
K=0.00000E+00
A4=7.14836E−04
A6=−5.38187E−05
A8=1.24153E−06

Variable Amount

| | Wide-angle end | Intermediate focal length | Telephoto end |
|---|---|---|---|
| A | 1.30888 | 8.95756 | 14.52007 |
| B | 13.77021 | 6.12143 | 0.55838 |
| C | 11.76575 | 7.50884 | 0.50038 |
| D | 3.57353 | 7.83025 | 14.83876 |
| E | 2.67224 | 5.71149 | 5.82142 |
| F | 3.55702 | 0.51762 | 0.40777 |

Values of Parameters in Each Condition
f1=19.00
f2=−11.09
fw=5.2
ft=35.0
f1/√(fw×ft)=1.41
f2/√(fw×ft)=−0.82
Y'=4.2
L1=13
L2=75.7
Lg1=27.61
fL1=−17.85
T=88.7
Tap=48.4
fw/Y'=1.24
L1/L2=0.17
Lg1/fw=5.31
L2/ft=2.16
|fL1/fw|=3.43
Tap/T=0.55

Figure 10:
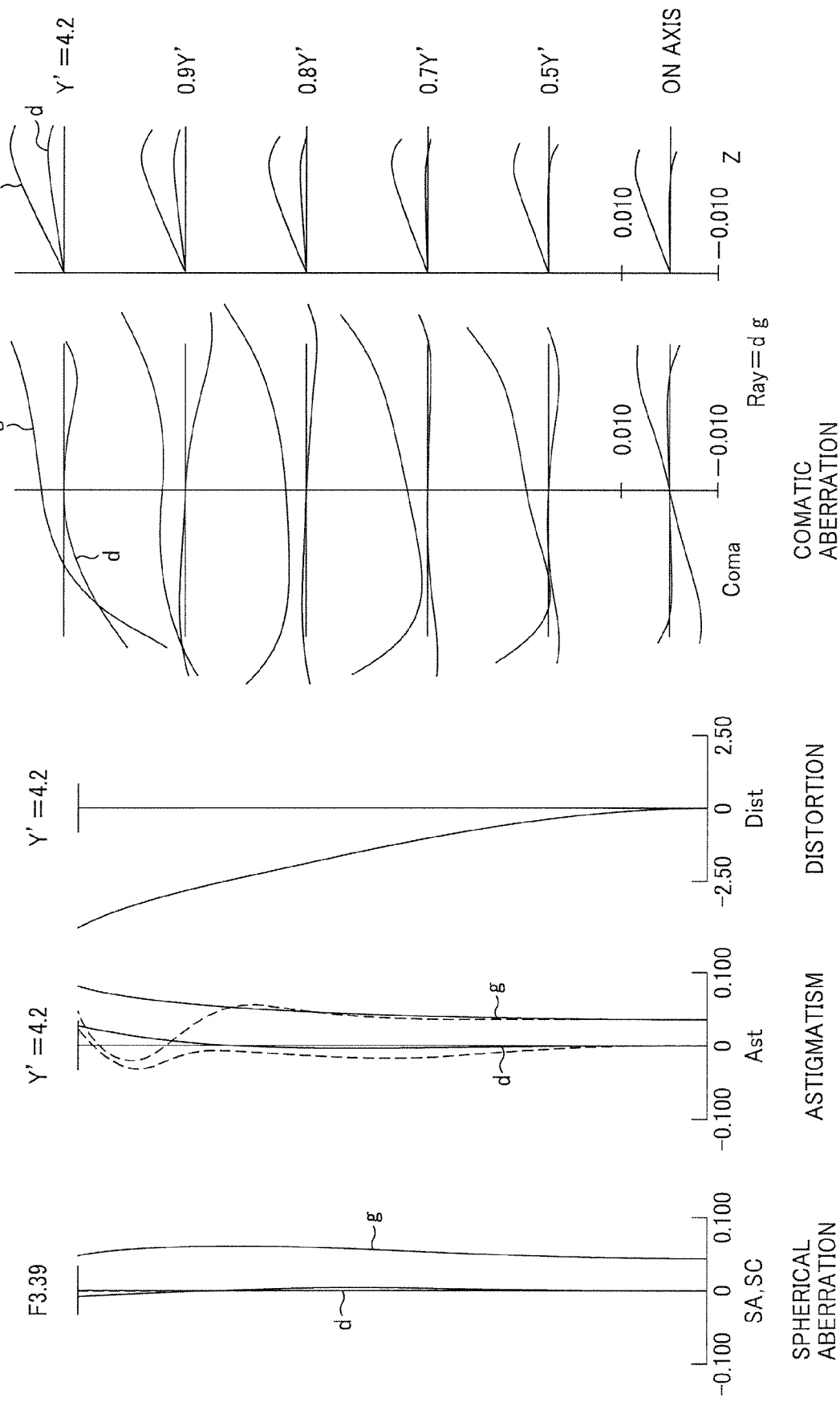
FIG. 10 illustrates aberration diagrams at a wide-angle end of the zoom lens unit according to the third embodiment.
Figure 11:
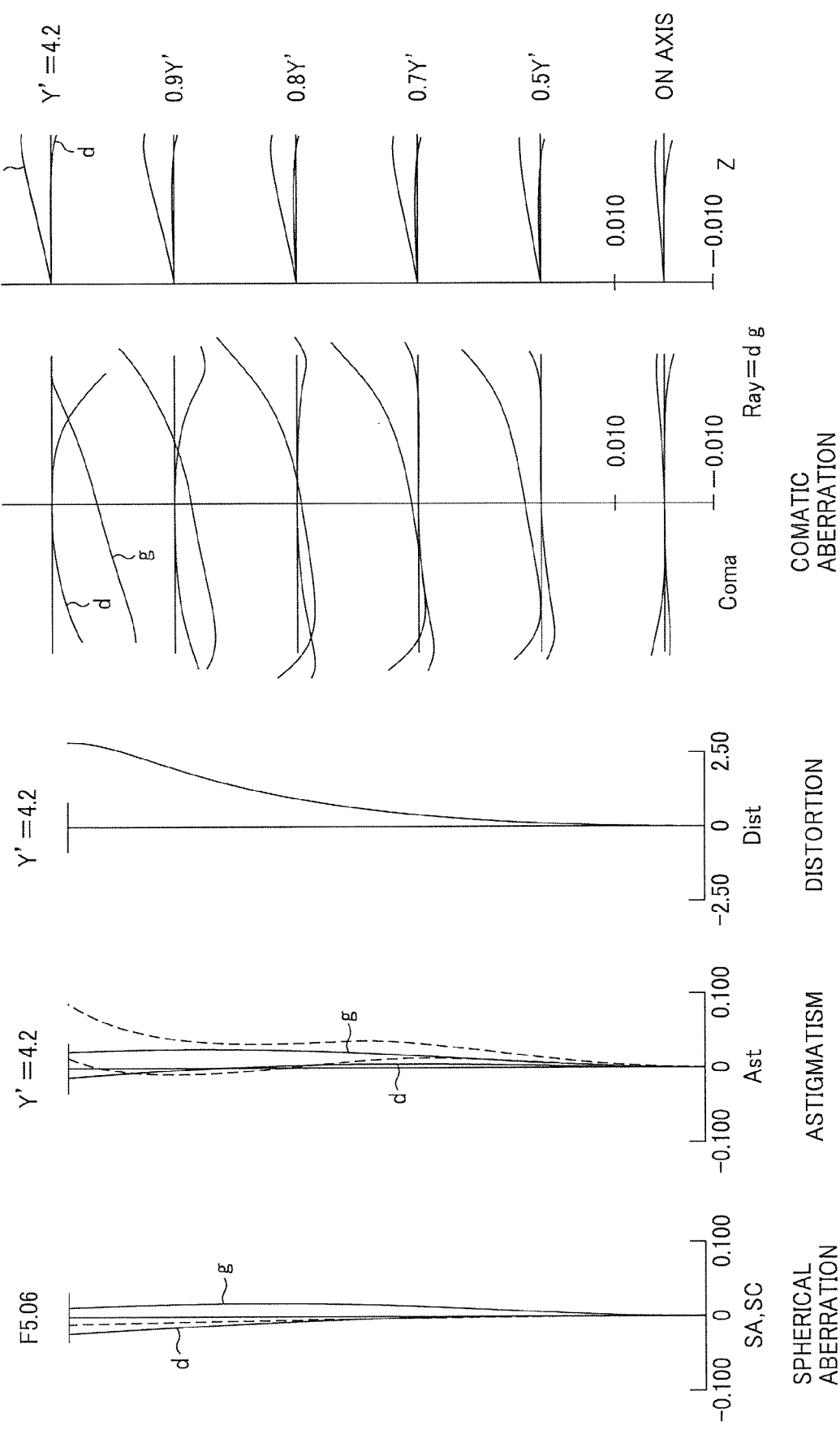
FIG. 11 illustrates aberration diagrams at a specific intermediate focal length of the zoom lens unit according to the third embodiment.
Figure 12:
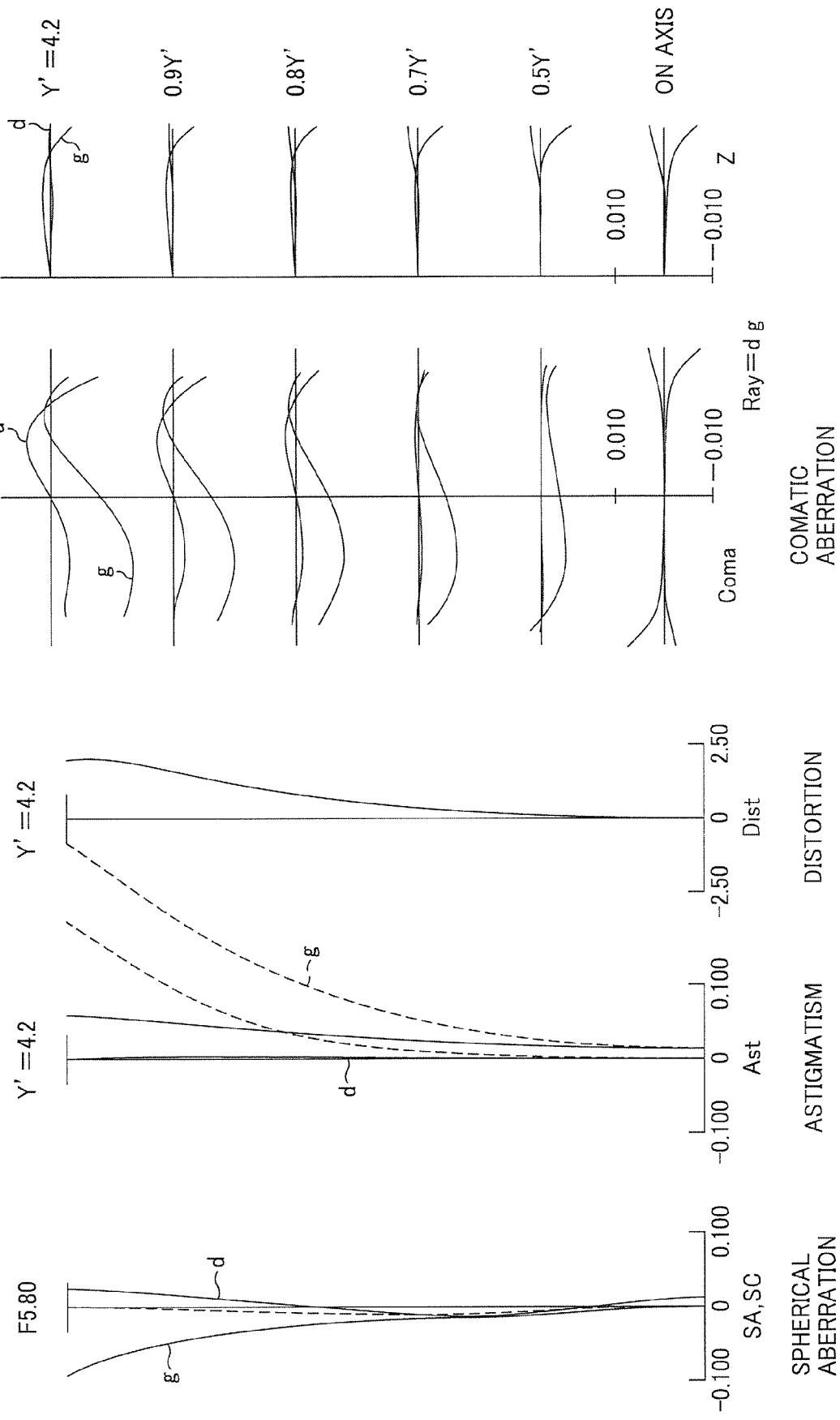
FIG. 12 illustrates aberration diagrams at a telephoto end of the zoom lens unit according to the third embodiment.

FIGS. 10, 11 and 12 illustrate various aberration diagrams of the zoom lens unit according to the third example, at the wide-angle end, the specific middle focal length and the telephoto end, respectively.

EXAMPLE 4 f = 5.2-35.0, F = 3.57-5.85, ω = 38.9-6.8

| Surface No. | R | D | $N_d$ | $v_d$ |
|---|---|---|---|---|
| 1 | 28.31032 | 0.70000 | 1.92286 | 18.90 |
| 2 | 11.25635 | 4.30000 | | |
| 3 | ∞ | 8.00000 | 1.88300 | 40.76 |
| 4 | ∞ | 8.00000 | 1.88300 | 40.76 |
| 5 | ∞ | 0.10000 | | |
| 6 | 85.85108 | 2.71603 | 1.51633 | 64.14 |
| 7 | −17.03452 | 0.10000 | | |
| 8 | 16.20458 | 2.25308 | 1.64000 | 60.08 |
| 9 | 910.38236 | Variable(A) | | |
| 10 | −31.86938 | 0.80000 | 2.00330 | 28.27 |
| 11 | 9.20213 | 2.94713 | | |
| 12 | −7.46158 | 1.06977 | 1.58913 | 61.15 |
| 13 | 35.36813 | 1.23606 | 1.92286 | 18.90 |
| 14 | −16.73301 | Variable(B) | | |
| 15 | ∞ (Aperture) | Variable(C) | | |
| 16 | 10.71389 | 2.84516 | 1.71700 | 47.93 |
| 17 | −3109.41267 | 4.32612 | | |
| 18 | 11.54987 | 3.02339 | 1.61800 | 63.33 |
| 19 | −8.68996 | 0.80000 | 1.90366 | 31.32 |
| 20 | 8.58883 | 0.44713 | | |
| 21 | 8.82218 | 2.40401 | 1.48749 | 70.24 |
| 22 | −19.30681 | Variable(D) | | |
| 23 | −104.23069 | 0.80000 | 1.92286 | 18.90 |
| 24 | 16.11154 | Variable(E) | | |

-continued f = 5.2-35.0, F = 3.57-5.85, ω = 38.9-6.8

| Surface No. | R | D | $N_d$ | $v_d$ |
|---|---|---|---|---|
| 25 | 21.61061 | 3.00000 | 1.48749 | 70.24 |
| 26 | −10.11978 | Variable(F) | | |
| 27 | −10.32054 | 0.80000 | 1.77250 | 49.60 |
| 28 | −12.64506 | 0.10000 | | |
| 29 | ∞ | 0.30000 | 1.52300 | 58.00 |
| 30 | ∞ | 0.10000 | | |
| 31 | ∞ | 0.50000 | 1.50000 | 64.00 |
| 32 | ∞ | | | |

Aspheric Surface
Second Surface
K=0.00000E+00
A4=−2.71728E−06
A6=−3.58900E−07
A8=1.70392E−09
A10=4.11931E−13
Eleventh Surface
K=0.00000E+00
A4=−1.24369E−04
A6=1.17040E−06
A8=−9.36061E−08
A10=−1.94537E−09
Sixteenth Surface
K=0.00000E+00
A4=−5.03986E−05
A6=1.88819E−07
A8=−4.04258E−09
A10=4.05202E−11
Twenty-Second Surface
K=0.00000E+00
A4=2.35721E−04
A6=1.56156E−06
A8=−1.45635E−07
A10=2.75915E−09
Twenty-Fourth Surface
K=0.00000E+00
A4=3.77794E−04
A6=1.16807E−05
A8=6.58942E−07
A10=−4.47280E−08
Twenty-Fifth Surface
K=0.00000E+00
A4=1.70399E−04
A6=2.68367E−05
A8=1.09834E−08
A10=−3.07464E−08
Twenty-Seventh Surface
K=0.00000E+00
A4=3.59460E−04
A6=−5.08998E−05
A8=1.62131E−06

Variable Amount

| | Wide-angle end | Intermediate focal length | Telephoto end |
|---|---|---|---|
| A | 0.889 | 5.001 | 8.828 |
| B | 8.566 | 4.454 | 0.628 |
| C | 11.188 | 5.755 | 0.500 |

-continued

Variable Amount

| | Wide-angle end | Intermediate focal length | Telephoto end |
|---|---|---|---|
| D | 5.424 | 10.858 | 16.113 |
| E | 1.000 | 3.351 | 3.485 |
| F | 3.167 | 0.816 | 0.682 |

Values of parameters in each condition
f1=12.9
F2=−7.0
fw=5.2
ft=35.0
f1/√(fw×ft)=0.96
f2/√(fw×ft)=−0.52
Y'=4.2
L1=13
L2=69.5
Lg1=26.17
fL1=−20.65
T=82.5
Tap=41.7
fw/Y'=1.24
L1/L2=0.19
Lg1/fw=5.03
L2/ft=1.99
|fL1/fw|=3.97
Tap/T=0.51

Figure 14:
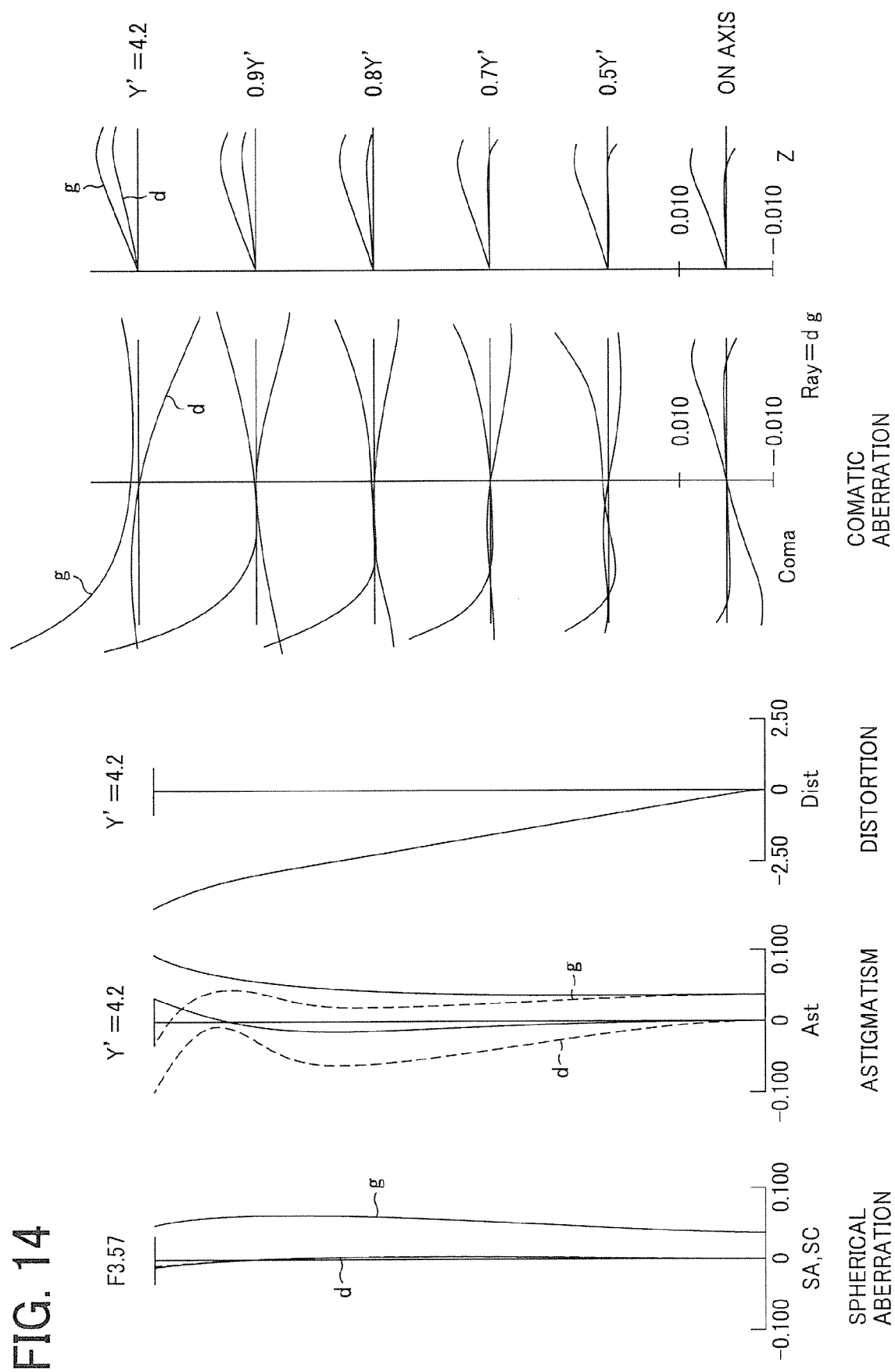
FIG. 14 illustrates aberration diagrams at a wide-angle end of the zoom lens unit according to the fourth embodiment.
Figure 15:
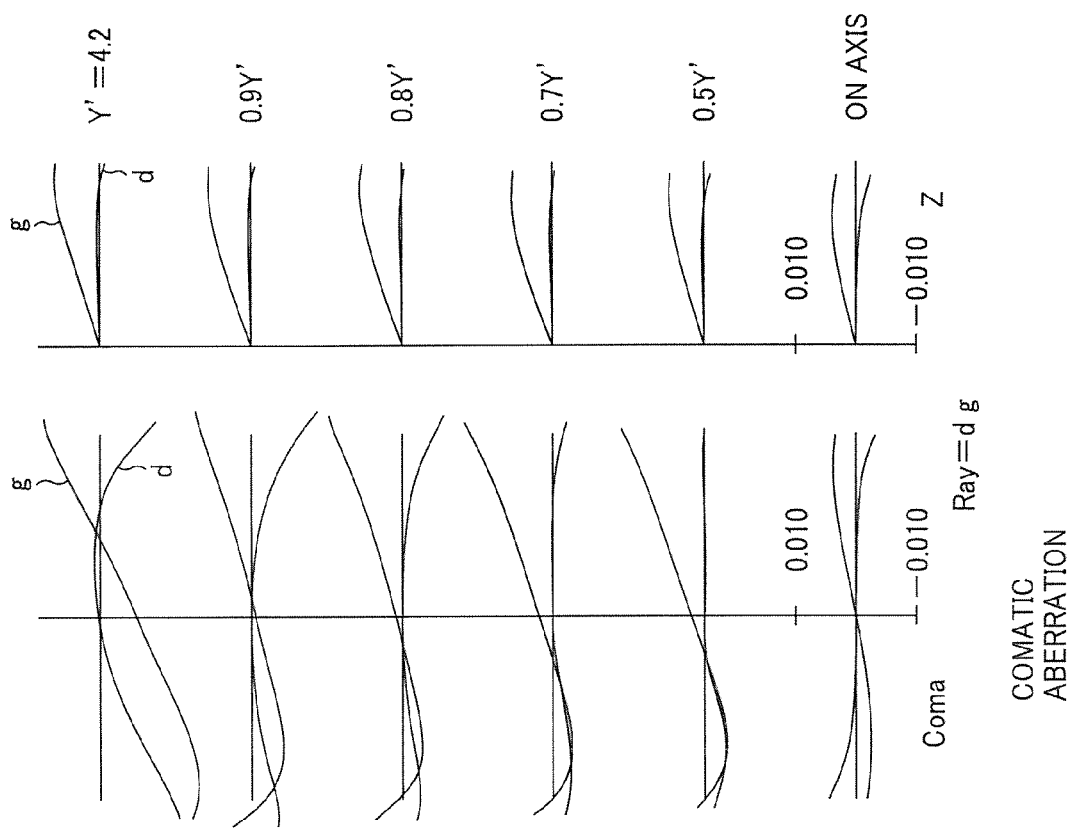
FIG. 15 illustrates aberration diagrams at a specific intermediate focal length of the zoom lens unit according to the fourth embodiment.
Figure 15:
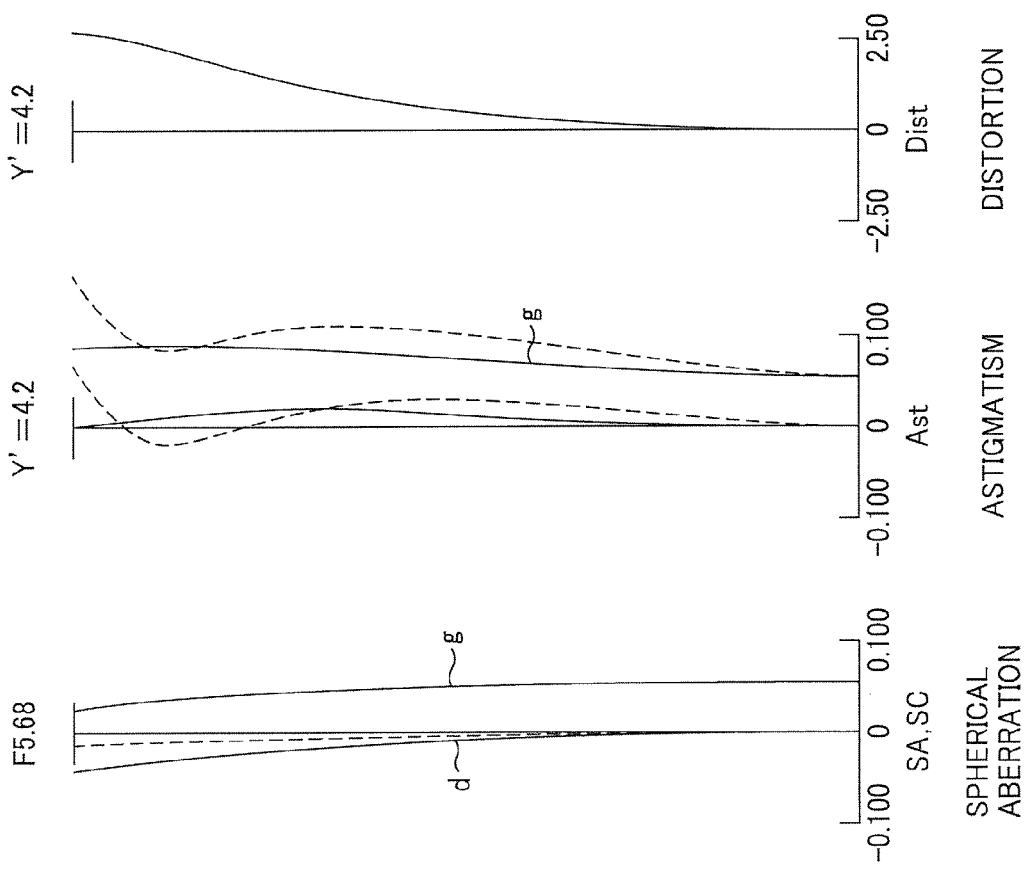
Figure 16:
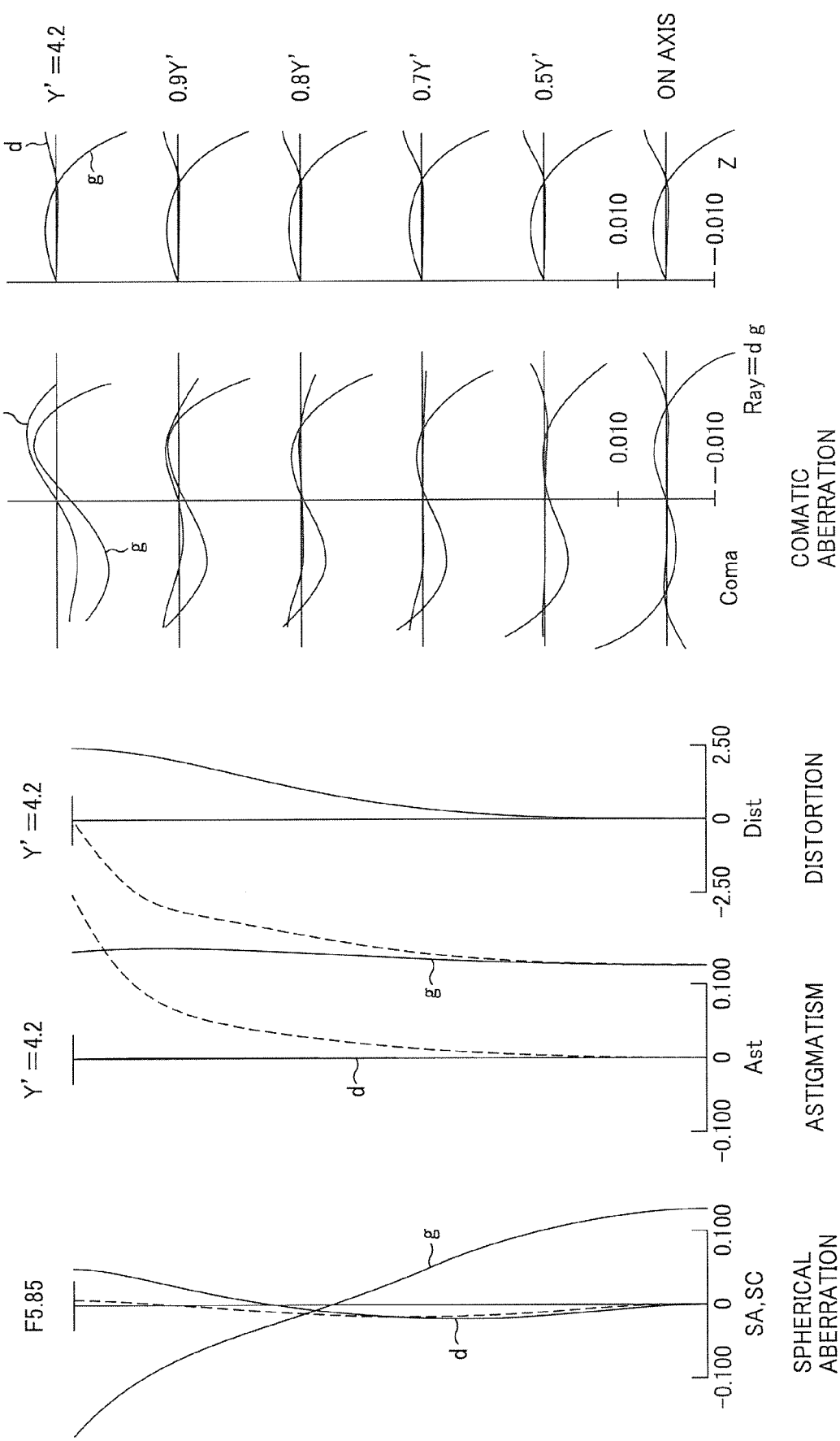
FIG. 16 illustrates aberration diagrams at a telephoto end of the zoom lens unit according to the fourth embodiment.

FIGS. 14, 15 and 16 illustrate various aberration diagrams of the zoom lens unit according to the fourth example, at the wide-angle end, the specific middle focal length and the telephoto end, respectively.

Each of the zoom lens units according to these Examples 1-4 has the half-field angle at the wide-angle end of 38 degrees or more (38.9 degrees in Examples 1-4), and the magnification ratio of 5 times or more (6.73 times in Examples 1-4), therefore the desired wide-field angle and high magnification ratio have been achieved.

In addition, each of the zoom lens units according to these Examples 1-4 satisfies the following formula:

$$0.5 < f1/\sqrt{(fw \times ft)} < 2 \quad (1)$$

in which f1 represents a focus length of the first lens group; fw represents a focus length of the entire zoom lens unit at the wide-angle end; and ft represents a focus length of the entire zoom lens unit at the telephoto end.

Further, each of the zoom lens units according to these Examples 1-4 satisfies the following formula:

$$-1.0 < f2/\sqrt{(fw \times ft)} < -0.3 \quad (2)$$

in which f2 represents a focus length of the second lens group; fw represents the focus length of the entire zoom lens unit at the wide-angle end; and ft represents the focus length of the entire zoom lens unit at the telephoto end.

The focal length of the first lens group f1 is set appropriately with the formula (1), depending on the lens performance. The denominator of the parameter f1/√(fw×ft), i.e., √(fw×ft) is a geometric average of the focal length of the zoom lens unit at the wide-angle end, fw, and the focal length of the zoom lens unit at the telephoto end, ft, as one rough standard for the magnification ratio. The parameter f1/√(fw×ft) represents a parameter where the focal length f1 is normalized by the above-mentioned geometric average.

If a lower limit, for example 0.5, of the parameter f1/√(fw× ft) is exceeded, it can inhibit the positive refracting power of the first lens group to become too great, and can suppress the generation of an aberration in the first lens group effectively. In addition, if the parameter f1/√(fw×ft) falls below an upper limit, for example 2, it can inhibit the positive refracting power of the first lens group to become too small and secure the positive refracting power moderately, and the total length of the zoom lens unit can be shortened.

The focal length of the second lens group f2 is set appropriately with the formula (2). The parameter f2/√(fw×ft) represents a parameter where the focal length f2 is normalized by the above-mentioned geometric average.

If a lower limit, for example −1.0, of the parameter f2/√(fw×ft) is exceeded, it can maintain the negative refracting power of the second lens group moderately, and can reduce a displacement of the second lens group, and can shorten the total length of the zoom lens unit, while obtaining a desired zoom ratio (in particular equals to or more than 5 times). In addition, if the parameter f2/√(fw×ft) falls below an upper limit, for example −0.3, it can inhibit the negative refracting power of the second lens group to become too great, and can suppress the generation of an aberration in the second lens group effectively.

The zoom lens unit according to the present invention is configured to provide an image on an imaging area of the image pickup device, and the reflecting optical element provided in the first lens group of the zoom lens unit is configured to bend the light path. According to a preferable embodiment, the light path is bent to a longer direction of the imaging area.

Generally, an imaging area of an image pickup device such as a CCD image sensor is in a rectangular shape. "The light path is bent to the longer direction of the imaging area" means that "a plane formed by an axis of incidence light to the first lens group and an axis of light bent by the reflecting optical element" is parallel to the longer direction of the photographing area.

Each of the zoom lens units according to these Examples 1-4 further satisfies the following formulae:

$$0.5 < fw/Y' < 1.4 \quad (3)$$

in which fw represents the focus length of the entire zoom lens unit at the wide-angle end, and Y' represents a maximum image height;

$$0.15 < L1/L2 < 0.22 \quad (4)$$

in which L1 represents a distance from a surface nearest to the object side to a reflecting face of the reflecting optical element on the optical axis; L2 represents a distance from the reflecting face of the reflecting optical element to an image plane on the optical axis;

$$3 < Lg1/fw < 7 \quad (5)$$

in which Lg1 represents a thickness of the first lens group on the optical axis, i.e., a distance on the optical axis from a surface of the first lens group nearest to the object side to a surface of the first lens group nearest to the image side, and fw represents the focus length of the entire zoom lens unit at the wide-angle end.

By satisfying the formula (3), a further wide-angle capability of the zoom lens unit which includes the reflecting optical element can be achieved.

The formula (4) represents a condition of optimizing a balance of aberration corrections and a size of the camera, which is necessary for achieving the wide-angle capability in the zoom lens unit that uses the reflecting optical element. The total length of the lens becomes greater and the miniaturization in the lateral direction of the camera becomes difficult when the ratio of L1/L2 falls below the lower limit, and when the ratio of L1/L2 exceeds the upper limit, the first lens group enlarges and the miniaturization in the thickness direction of the camera becomes difficult.

The formula (5) represents another condition of optimizing the balance of the aberration corrections and the size of the camera, which is necessary for achieving the wide-angle capability. A power of each lens group becomes too strong and the aberration corrections become difficult when the ratio of Lg1/fw falls below the lower limit, and when the ratio of Lg1/fw exceeds the upper limit, the first lens group enlarges and the miniaturization in the thickness direction of the camera becomes difficult.

In addition, each of the zoom lens units according to these Examples 1-4 further satisfies the following formulae:

$$1.21 \, L2/ft < 3 \quad (6)$$

in which L2 represents the distance from the reflecting face of the reflecting optical element to the image plane on the optical axis, and ft represents the focus length of the entire zoom lens unit at the telephoto end; and $$2 < |fL1/fw| < 5 \quad (7)$$

in which fL1 represents a combined focal length of an optical element which is located nearer the object side than the reflecting optical element, and fw represents the focus length of the entire zoom lens unit at the wide-angle end; and $$0.3 < Tap/T < 0.7 \quad (8)$$

in which Tap represents a distance from the surface nearest to the object side to the aperture stop on the optical axis, when the sixth lens group is fixed during changing magnification, and T represents a total length of the zoom lens unit.

The formula (6) represents a condition of optimizing a balance of aberration corrections of a zoom lens unit with high magnification ratio and a size of the camera. A power of each lens group becomes too strong and the aberration corrections become difficult when the ratio of L2/ft falls below the lower limit, and when the ratio of L2/ft exceeds the upper limit, the zoom lens unit enlarges and the miniaturization of the camera becomes difficult.

The formula (7) represents a condition of optimizing the balance of the aberration corrections and the size of the camera, which is necessary for achieving the wide-angle capability. The power of each lens group becomes too strong and the aberration corrections become difficult when the ratio of |fL1/fw| falls below the lower limit, and when the ratio of |fL1/fw| exceeds the upper limit, the first lens group enlarges and the miniaturization in the thickness direction of the camera becomes difficult.

The formula (8) is used for setting a condition concerning an arrangement of the aperture stop in the zoom lens unit. A diameter of a lens group following the aperture stop, for example, the third lens group increases and it becomes disadvantageous in the aberration corrections, when the ratio of Tap/T falls below the lower limit, and when the ratio of Tap/T exceeds the upper limit, the diameter of the first lens group increases and it brings disadvantages in the miniaturization of the camera.

Further, in each of the zoom lens units according to these Examples 1-4, the aperture stop (S) is fixed when changing magnification. The sixth lens group (VI) is fixed when changing magnification and when focusing, and the focusing operation is performed by the fifth lens group (V).

The fifth lens group corrects a position variation of the image plane by changing magnification, i.e., works as a so-called "compensator". The fifth lens group can perform a focusing function corresponding to a displacement of an object point, as well.

Moreover, due to the first lens group, the aperture stop, the fourth lens group and the sixth lens group being fixed when changing magnification, it can prevent the lens barrel unit from being enlarged and achieve wide-angle capability and high magnification ratio, though the zoom lens unit includes a relatively large number of lens groups.

The imaging apparatus according to the present invention includes the above-mentioned zoom lens unit, and the image pickup device. An image by the zoom lens unit is captured by the image pickup device.

According to an aspect of the present invention, a reflecting optical element is provided in a first lens group of a zoom lens unit to bend a light path, therefore it is possible to obtain a predetermined light path length and reduce a thickness of a camera in an axial direction of an incident light when the camera such as a digital camera employs the zoom lens unit.

In addition, the first lens group provided with the reflecting optical system is fixed when changing magnification, thus when it is used in a zoom lens of an imaging apparatus such as a digital camera, an outer shape of the imaging apparatus will not change by changing magnification, due to the first lens group being fixed when changing magnification. Therefore, it is possible to perform a waterproof treatment for the imaging apparatus easily and reliably.

According to a further preferable embodiment of the present invention, due to a reflecting optical element being provided in a first lens group and the first lens group being fixed when changing magnification, movement lens groups which will move when changing magnification (for example, lens groups except for the first lens group and a fourth lens group) are displaced in a "part where a light path is straight", therefore it is possible to simplify a displacement mechanism of the movement lens groups.

According to a preferable embodiment of the present invention, it is possible to provide a zoom lens unit of which a half-field angle at a wide-angle end is 38 degrees or more, and of which a magnification ratio is 5 times or more, therefore it is possible to obtain a good digital camera satisfying demands of the users due to realization of the wide-field angle and the high magnification ratio.

According to a further preferable embodiment of the present invention, an aperture is fixed when changing magnification. Although the aperture (sometimes including a shutter) is possible to be displaced when changing magnification, a lens barrel will be enlarged easily in a radial direction if the aperture is displaced when changing magnification, due to an adjustment mechanism which controls an amount of light being displaced together.

According to a further preferable embodiment of the present invention, a first lens group, a fourth lens group and a sixth lens group of a zoom lens unit are fixed when changing magnification, therefore it is possible to prevent a lens barrel unit from being enlarged, and wide-angle capability and high magnification ratio can be easily achieved, although the zoom lens unit includes six lens groups, which is a comparatively large constitution of lens groups.

According to another aspect of the present invention, when a zoom lens unit including a reflecting optical element is used in such as a digital camera, a thickness of the camera in an optical axis can be reduced.

However, in the zoom lens unit in which the reflecting optical element is provided, due to a first lens group being fixed relative to an image plane, there is a trend that an optical overall length becomes long to achieve a high magnification ratio, and in a case of the zoom lens unit according to the present invention where the reflecting optical element is disposed in the first lens group, a light path length after being bent with the reflecting optical element tends to get longer, and then a predetermined light path length can be obtained readily.

In general, a longer direction of an imaging area corresponds to a right and left direction when the camera is held for photographing. When the light path is bent with the reflecting optical element in a "shorter direction of the imaging area", the light path after being bent with the reflecting optical element is required to be in a vertical direction to make the longer direction of the imaging area correspond to the right and left direction when holding the camera for photographing, and thus the camera (image pickup device) is in a "vertically long" shape, and it is disadvantageous in respect of miniaturization.

In the zoom lens unit according to the other aspect of the present invention, the light path is bent in the longer direction of the imaging area, thus a lens barrel unit is arranged in parallel to a lateral direction of the camera (the right and left direction when the camera is holding), therefore it is advantageous to produce a compact camera.

Figure 18A:
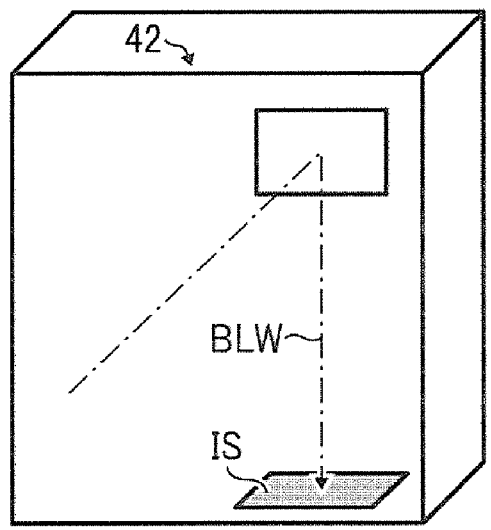
FIGS. 18A and 18B are views explaining bending of a light path in the imaging apparatus according to the present invention.
Figure 18B:
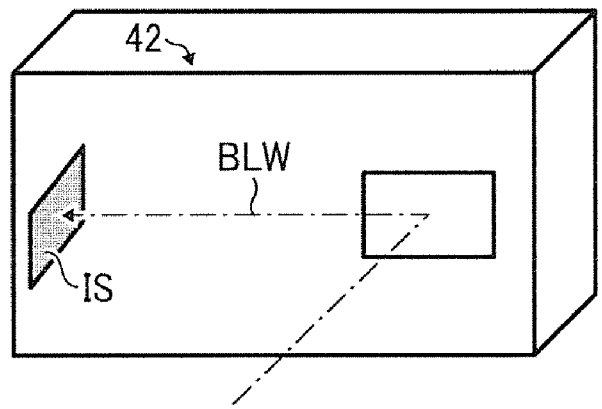

FIGS. 18A and 18B illustrate examples of bending of a light path in an imaging apparatus. In the figures, numeral 42 represents an outer shape of an imaging apparatus, for example, which is simplified as a rectangular parallelepiped shape, IS represents an imaging area of an image pickup device, and BLW represents a "bent light path".

FIG. 18A illustrates a case where the light path is bent to a shorter direction of the imaging area (IS). When the imaging apparatus is set up for photographing, and the imaging area (IS) is set in a right and left direction, naturally a long light path part after being bent is in a vertical direction, as illustrated in FIG. 18A, and thus the outer shape of the imaging apparatus is in a "vertically long" shape.

FIG. 18B illustrates a case where the light path is bent to a longer direction of the imaging area (IS). When the imaging apparatus is set up for photographing, the imaging area (IS) is arranged in one of right and left side surfaces of the imaging apparatus, the shorter direction of the imaging area (IS) being set as the vertical direction, and a long light path part after being bent of the bent light path (BLW) is in the lateral direction of the imaging apparatus, and the outer shape of the imaging apparatus which is allocable of a lens barrel unit (not illustrated) is in a "horizontally long" shape.

According to a further preferable embodiment of the present invention, in a zoom lens unit which is capable of including six lens groups having positive/negative/positive/negative/positive/positive refracting power, or six lens groups having positive/negative/positive/negative/positive/negative refracting power, a second lens group is constructed as a so-called variator to bear a major changing magnification function, and lens groups following a third lens group share the changing magnification function as well to reduce the burden of the second lens group. Accordingly, flexible correction to aberration corrections which become difficult with high magnification ratio can be secured.

According to the present invention explained above, it can provide a compact zoom lens unit, aberrations of which are corrected sufficiently. And thus a compact imaging apparatus such as a digital camera with high performance can be obtained by using such a zoom lens unit. In addition, it can contribute to energy conservation by the miniaturization of parts and the reduction in the number of parts due to the miniaturization of the imaging apparatus.

It should be noted that although the present invention has been described with respect to exemplary embodiments, the invention is not limited thereto. In view of the foregoing, it is intended that the present invention cover modifications and variations provided they fall within the scope of the following claims and their equivalent.

The entire contents of Japanese patent applications No. JP 2007-293621 filed on Nov. 12, 2007, and JP 2008-164467 filed on Jun. 24, 2008, of which the convention priorities are claimed in this application, are incorporated hereinto by reference.

What is claimed is:

1. A zoom lens unit comprising, in order from an object side to an image side:
    a first lens group having a positive refracting power, which is fixed when changing magnification from a wide-angle end to a telephoto end;
    a second lens group having a negative refracting power;
    a third lens group having a positive refracting power;
    a fourth lens group having a negative refracting power, which is fixed when changing magnification from the wide-angle end to the telephoto end;
    a fifth lens group having a positive refracting power; and
    a sixth lens group having a negative refracting power,
    an aperture stop being disposed between the second lens group and the third lens group,
    wherein when changing magnification from the wide-angle end to the telephoto end, at least the second lens group, the third lens group and the fifth lens group are moved, and
    wherein the first lens group includes a reflecting optical element which is configured to bend a light path in the first lens group to obtain a predetermined light path length.

2. A zoom lens unit according to claim 1, wherein a half-field angle at the wide-angle end is 38 degrees or more, and a magnification ratio is 5 times or more.

3. A zoom lens unit according to claim 1, wherein the following formula is satisfied:

$$0.5 < f1/\sqrt{(fw \times ft)} < 2 \quad (1)$$

in which f1 represents a focus length of the first lens group; fw represents a focus length of the entire zoom lens unit at the wide-angle end; and ft represents a focus length of the entire zoom lens unit at the telephoto end.

4. A zoom lens unit according to claim 1, wherein the following formula is satisfied:

$$-1.0 < f2/\sqrt{(fw \times ft)} < -0.3 \quad (2)$$

in which f2 represents a focus length of the second lens group; fw represents the focus length of the entire zoom lens unit at the wide-angle end; and ft represents the focus length of the entire zoom lens unit at the telephoto end.

5. A zoom lens unit according to claim 1, wherein the aperture stop is fixed when changing magnification.

6. A zoom lens unit according to claim 1, wherein the sixth lens group is fixed when changing magnification and when focusing.

7. A zoom lens unit according to claim 1, wherein the focusing is performed by the fifth lens group.

8. A zoom lens unit according to claim 1, wherein the zoom lens unit is used to provide an image on an imaging area of an image pickup device, and
    wherein the reflecting optical element in the first lens group is configured to bend the light path to a longer direction of the imaging area of the image pickup device.

9. A zoom lens unit according to claim 1, wherein the following formula is satisfied:

$$0.5 < fw/Y' < 1.4 \quad (3)$$

in which fw represents the focus length of the entire zoom lens unit at the wide-angle end, and Y' represents a maximum image height.

10. A zoom lens unit according to claim 1, wherein the following formula is satisfied:

$$0.15 < L1/L2 < 0.22 \quad (4)$$

in which L1 represents a distance from a surface nearest to the object side to a reflecting face of the reflecting optical element on an optical axis; L2 represents a distance from the reflecting face of the reflecting optical element to an image plane on the optical axis.

11. A zoom lens unit according to claim 1, wherein the following formula is satisfied:

$$3 < Lg1/fw < 7 \quad (5)$$

in which Lg1 represents a thickness of the first lens group on the optical axis, and fw represents the focus length of the entire zoom lens unit at the wide-angle end.

12. A zoom lens unit according to claim 1, wherein the following formula is satisfied:

$$1 < L2/ft < 3 \quad (6)$$

in which L2 represents the distance from the reflecting face of the reflecting optical element to the image plane on the optical axis, and ft represents the focus length of the entire zoom lens unit at the telephoto end.

13. A zoom lens unit according to claim 1, wherein the following formula is satisfied:

$$2 < |fL1/fw| < 5 \quad (7)$$

in which fL1 represents a combined focal length of an optical element which is located nearer the object side than the reflecting optical element, and fw represents the focus length of the entire zoom lens unit at the wide-angle end.

14. A zoom lens unit according to claim 1, wherein the following formula is satisfied:

$$0.3 < Tap/T < 0.7 \quad (8)$$

in which Tap represents a distance from the surface nearest to the object side to the aperture stop on the optical axis, when the sixth lens group is fixed during changing magnification, and T represents a total length of the zoom lens unit.

15. An imaging apparatus, comprising:
    a zoom lens unit according to any one of claims 1-14; and
    an image pickup device,
    an image by the zoom lens unit being captured by the image pickup device.

* * * * *